United States Patent [19]

Clarke

[11] Patent Number: 4,563,750
[45] Date of Patent: Jan. 7, 1986

[54] FAST FOURIER TRANSFORM APPARATUS WITH DATA TIMING SCHEDULE DECOUPLING
[76] Inventor: William L. Clarke, 2221 Aralia St., Newport Beach, Calif. 92660
[21] Appl. No.: 472,067
[22] Filed: Mar. 4, 1983
[51] Int. Cl.$^4$ .................................... G06F 15/31
[52] U.S. Cl. ...................................... 364/726
[58] Field of Search ........................... 364/726
[56] References Cited

U.S. PATENT DOCUMENTS

| | | | |
|---|---|---|---|
| 3,544,775 | 12/1970 | Bergland et al. | 364/726 |
| 3,584,782 | 6/1971 | Bergland | 364/726 |
| 3,591,784 | 7/1971 | Cutter et al. | 364/726 |
| 3,662,161 | 5/1972 | Bergland et al. | 364/726 |
| 3,673,399 | 6/1972 | Hancke et al. | 364/726 |
| 3,702,393 | 11/1972 | Fuss | 364/726 |
| 3,746,848 | 7/1973 | Clary | 364/726 |
| 3,754,128 | 8/1973 | Corinthios | 364/726 |
| 3,777,131 | 12/1973 | Liewellyn | 364/726 |
| 3,783,258 | 1/1974 | Chwastyk | 364/726 |
| 3,871,577 | 3/1975 | Avellar et al. | 364/726 |
| 3,881,100 | 4/1975 | Works et al. | 364/726 |
| 3,920,978 | 11/1975 | Schmitt et al. | 364/726 |
| 4,027,257 | 5/1977 | Perreault | 333/18 |
| 4,058,715 | 11/1977 | Niwa | 364/726 |
| 4,092,723 | 5/1978 | Picquendar et al. | 364/726 |
| 4,106,103 | 8/1978 | Perreault | 364/827 |
| 4,117,541 | 9/1978 | Ali | 364/724 |
| 4,131,764 | 12/1978 | Claasen et al. | 364/726 |
| 4,131,766 | 12/1978 | Narasimha | 364/726 |
| 4,138,730 | 2/1979 | Ali | 364/726 |
| 4,158,888 | 6/1979 | Shapiro et al. | 364/726 |
| 4,223,185 | 9/1980 | Picou | 364/726 |
| 4,225,937 | 9/1980 | Perreault et al. | 364/726 |
| 4,231,102 | 10/1980 | Barr et al. | 364/726 |
| 4,241,411 | 12/1980 | Krasner et al. | 364/726 |
| 4,275,452 | 6/1981 | White | 364/726 |
| 4,393,457 | 7/1983 | New | 364/726 |
| 4,477,878 | 10/1984 | Cope | 364/726 |

FOREIGN PATENT DOCUMENTS

| | | |
|---|---|---|
| 2305095 | 8/1974 | Fed. Rep. of Germany . |
| 2644506 | 4/1977 | Fed. Rep. of Germany . |
| 645163 | 3/1979 | U.S.S.R. . |

OTHER PUBLICATIONS

Tokoro et al., "Fast Fourier Transform by Hardware", Systems—Computers—Controls, vol. 6, No. 5, Sep.-Oct. 1975, pp. 58-67.
Pelod et al., Digital Signal Processing—Theory, Design, and Implementation, John Wiley and Sons (1976), pp. 1-42, and 142-166.
Bringham, The Fast Fourier Transform (FFT), Prentice-Hall, Inc. (1974), pp. 148-197.

Primary Examiner—David H. Malzahn
Attorney, Agent, or Firm—Allan R. Fowler; Howard R. Lambert; Walter A. Hackler

[57] ABSTRACT

A fast Fourier transform (FFT) apparatus with data timing schedule decoupling is provided for obtaining the Fourier spectrum, $f_m$, of a sequence of N data: $S_0$, $S_1 \ldots S_{N-1}$, derived from a time variable function, $S_t$. The apparatus is operative for performing $\alpha$ sets of N/2 pairs of "butterfly" operations of the general form:

$$A(x)' = A(x) + W_{(z)} \cdot A(y) \text{ and}$$

$$A(y)' = A(x) - W_{(z)} \cdot A(y),$$

wherein $A(x)$ and $A(y)$ are data terms to be operated on and $W_{(z)}$ is a predetermined "pointer" into a corresponding matrix or phase angle library; $\alpha$ is determined by the relationship $N = 2^\alpha$. Comprising the apparatus are a first, $A(x)$, $A(y)$ data memory, a second, $W_{(z)}$ data memory, a multiplier accumulator (MAC) and an adder/subtractor. First data buffering means are disposed between the first memory and the MAC and adder/subtractor to buffer the flow of $A(x)$, $A(y)$ data from the first memory to the MAC and adder/subtractor, and second data buffering means are disposed between the MAC and the adder/subtractor to buffer the flow of $W_{(z)} \cdot A(y)$ data from the former to the latter, the data flow buffering thereby decoupling the timing schedules for data transfer and for data use. In a disclosed wraparound FFT, third data buffering means are disposed between the adder/subtractor and the first memory to buffer the flow of $A(x)'$ and $A(y)'$ data from the adder/subtractor to the first memory.

13 Claims, 17 Drawing Figures

$$S_n = \int_0^T S(t) \cdot \delta(t - n\Delta t)\,dt$$

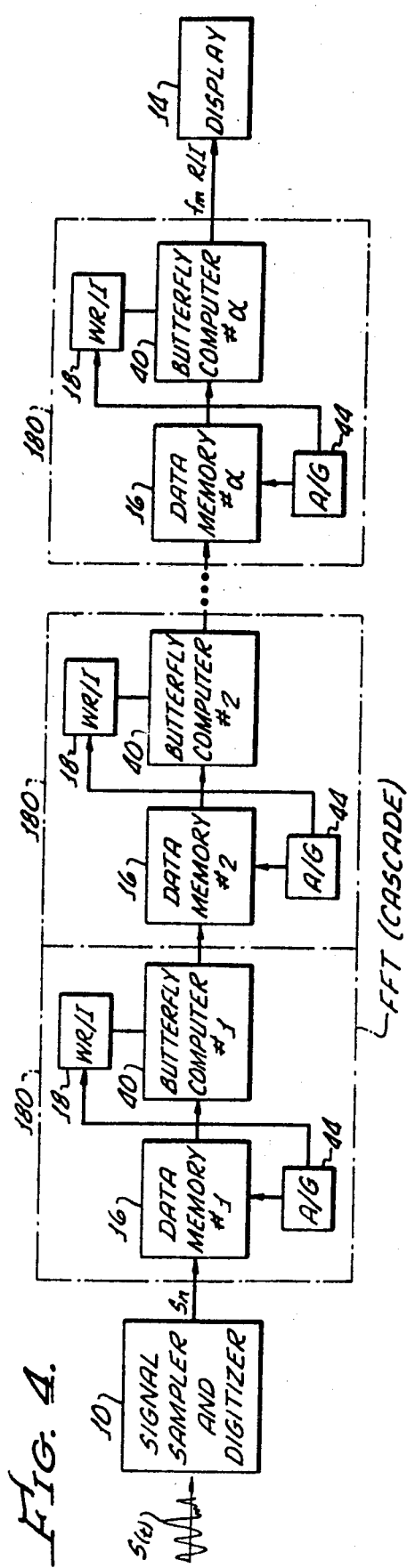
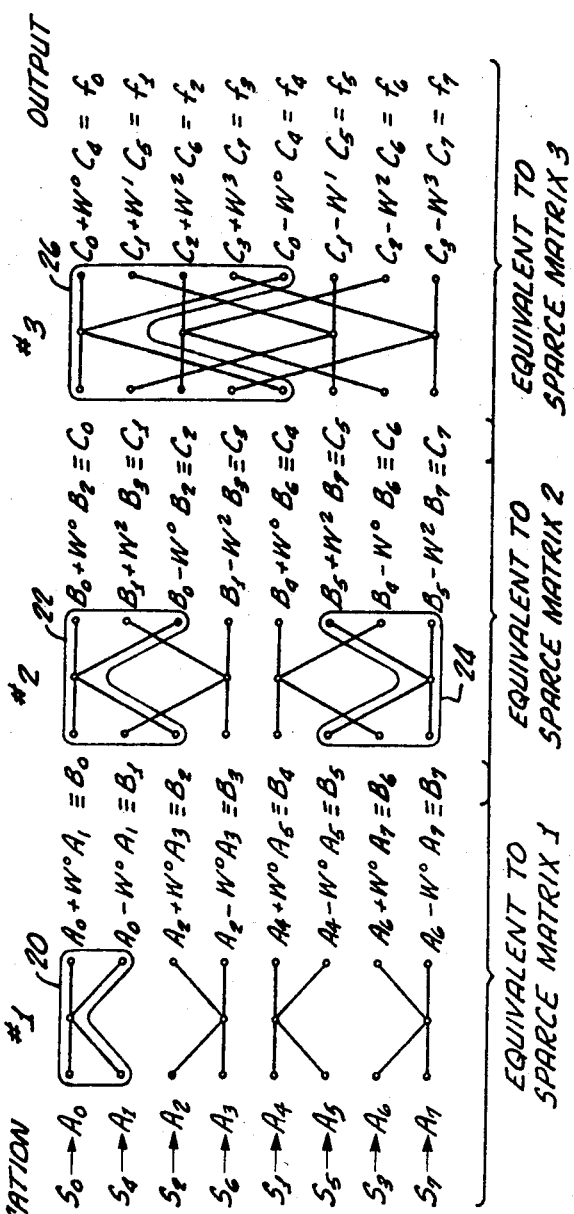

TIMING DIAGRAM FFT 12.

| ① ESTABLISHES<br>$A_{(n)}R/I$ ADDRESS IN FIRST MEMORY 16<br>$W_{(g)}I$ ADDRESS IN SECOND MEMORY 18 | ⑤ TRANSFERS<br>$A_{(n)}R$ FROM YR BUFFER TO MAC "A" 124<br>$W_{(g)}R$ FROM SECOND MEMORY TO MAC "B" 126<br>OPERATES<br>MULT $A_{(n)}R \cdot W_{(g)}R \to PR$ BUFFER 150 | ⑨ TRANSFERS<br>$A_{(n)}R$ FROM XR BUFFER TO +/- 138<br>$A_{(n)}R \cdot W_{(g)}R$ MINUS $A_{(n)}I \cdot W_{(g)}I$ FROM PR TO +/- 138<br>OPERATES<br>MULT $A_{(n)}I \cdot W_{(g)}R \to PI$ BUFFER<br>$A_{(n)}R + PR = A_{(n)}R \to T_{(n)}R$ BUFFER | ⑬ TRANSFERS<br>$T_{(n)}R(A_{(n)}R')$ TO FIRST MEMORY $A_{(n)}R$ 116<br>$T_{(n)}R(A_{(n)}I')$ TO FIRST MEMORY $A_{(n)}I$ 118 |
|---|---|---|---|
| ② ESTABLISHES<br>$A_{(n)}I$ ADDRESS IN FIRST MEMORY 16<br>$W_{(g)}I$ ADDRESS IN SECOND MEMORY 18 | ⑥ TRANSFERS<br>$A_{(n)}I$ FROM YI BUFFER TO MAC "A" 124<br>$W_{(g)}I$ FROM SECOND MEMORY TO MAC "B" 126<br>OPERATES<br>MULT $A_{(n)}I \cdot W_{(g)}I \to PR$ BUFFER 150 | ⑩ TRANSFERS<br>$A_{(n)}I$ FROM XR BUFFER TO +/- 138<br>$A_{(n)}R \cdot W_{(g)}R$ MINUS $A_{(n)}I \cdot W_{(g)}I$ FROM PR TO +/- 138<br>OPERATES<br>$A_{(n)}R - PR = A_{(n)}R \to T_{(n)}R$ BUFFER | ⑭ TRANSFERS<br>$T_{(n)}R(A_{(n)}R')$ TO FIRST MEMORY $A_{(n)}R$ 116<br>$T_{(n)}I(A_{(n)}I')$ TO FIRST MEMORY $A_{(n)}I$ 118 |
| ③ TRANSFERS<br>$A_{(n)}R$ FROM FIRST MEMORY TO XR BUFFER 146<br>$A_{(n)}I$ FROM FIRST MEMORY TO XI BUFFER 148 | ⑦ TRANSFERS<br>$A_{(n)}R$ FROM YR BUFFER TO MAC "A" 124<br>$W_{(g)}I$ FROM SECOND MEMORY TO MAC "B" 126<br>OPERATES<br>MULT $A_{(n)}R \cdot W_{(g)}I \to PI$ BUFFER 150 | ⑪ TRANSFERS<br>$A_{(n)}I$ FROM XI BUFFER TO +/- 138<br>$A_{(n)}R \cdot W_{(g)}I$ PLUS $A_{(n)}I \cdot W_{(g)}R$ FROM PI TO +/- 138<br>OPERATES<br>$A_{(n)}R + PI = A_{(n)}I' \to T_{(n)}I$ BUFFER 168 | |
| ④ TRANSFERS<br>$A_{(n)}R$ FROM FIRST MEMORY TO YR BUFFER 142<br>$A_{(n)}I$ FROM FIRST MEMORY TO YI BUFFER 144 | ⑧ TRANSFERS<br>$A_{(n)}I$ FROM YI BUFFER TO MAC "A" 124<br>$W_{(g)}R$ FROM SECOND MEMORY TO MAC "B" 126<br>OPERATES<br>MULT $A_{(n)}I \cdot W_{(g)}R \to PI$ BUFFER 152 | ⑫ TRANSFERS<br>$A_{(n)}I$ FROM XI BUFFER TO +/- 138<br>$A_{(n)}R \cdot W_{(g)}I$ PLUS $A_{(n)}I \cdot W_{(g)}R$ FROM PI TO +/- 138<br>OPERATES<br>$A_{(n)}I - PI = A_{(n)}I' \to T_{(n)}I$ BUFFER 170 | |

Fig. 7.

TIMING DIAGRAM FFT 12b

| | | |
|---|---|---|
| (1) ESTABLISHES $A_{(x)}R/I$ ADDRESS FOR FIRST MEMORY 16 | (9) TRANSFERS $A_{(x)}I$ TO $A_{(x)}R/I$ BUFFER 184 | (17) TRANSFERS $A_{(x)}R$ TO MR 130 $A_{(y)}R$ TO MA 124 $W_{(3)}R$ TO MB 126 OPERATES $MR + A_{(y)}I \cdot W_{(3)}R \rightarrow T\ 96b$ |
| (2) ESTABLISHES $A_{(y)}R/I$ ADDRESS FOR FIRST MEMORY 16 | (10) | (18) TRANSFERS $T \rightarrow A_{(x)}'I$ IN MEMORY 16 $A_{(y)}I$ TO MA 124 $W_{(3)}I$ TO MB 126 OPERATES $A_{(x)}R - A_{(y)}R \cdot W_{(3)}R \rightarrow MR\ 130$ |
| (3) ESTABLISHES $W_{(3)}R/I$ ADDRESS FOR SECOND MEMORY 18 | (11) TRANSFERS $A_{(y)}I$ TO $A_{(y)}R/I$ BUFFER 182 | (19) TRANSFERS $A_{(x)}I$ TO MR 130 $A_{(y)}R$ TO MA 124 $W_{(3)}I$ TO MB 126 OPERATES $MR + A_{(y)}I \cdot W_{(3)}I \rightarrow T\ 96b$ |
| (4) | (12) | (20) TRANSFERS $T \rightarrow A_{(y)}'R$ IN MEMORY 16 $A_{(y)}I$ TO MA 124 $W_{(3)}R$ TO MB 126 OPERATES $A_{(x)}I - A_{(y)}R \cdot W_{(3)}I \rightarrow MR\ 130$ |
| (5) TRANSFERS $A_{(x)}R$ FROM FIRST MEMORY TO $A_{(x)}R/I$ BUFFER 184 | (13) TRANSFERS $A_{(x)}R$ FROM $A_{(x)}R/I$ TO MR 130 $A_{(y)}R$ FROM $A_{(y)}R/I$ TO MA 124 $W_{(3)}R$ TO MB | (21) OPERATES $MR - A_{(y)}I \cdot W_{(3)}R \rightarrow T\ 96b$ |
| (6) | (14) TRANSFERS $A_{(y)}I$ TO MA 124 $W_{(3)}I$ TO MB 126 OPERATES $A_{(x)}R + A_{(y)}R \cdot W_{(3)}R \rightarrow MR\ 130$ | (22) TRANSFERS $T \rightarrow A_{(y)}'I$ IN MEMORY 16 |
| (7) TRANSFERS $A_{(y)}R$ FROM FIRST MEMORY TO $A_{(y)}R/I$ BUFFER 182 | (15) TRANSFERS $A_{(x)}I$ TO MR 130 $A_{(y)}R$ TO MA 124 $W_{(3)}I$ TO MB 126 OPERATES $MR - A_{(y)}I \cdot W_{(3)}I \rightarrow T\ 96b$ | (23) |
| (8) | (16) TRANSFERS $T \rightarrow A_{(x)}'R$ IN MEMORY 16 $A_{(y)}I$ TO MA 124 $W_{(3)}R$ TO MB 126 OPERATES $A_{(x)}I + A_{(y)}R \cdot W_{(3)}I \rightarrow MR\ 130$ | (24) |

*FIG. 15.*

FAST FOURIER TRANSFORM APPARATUS WITH DATA TIMING SCHEDULE DECOUPLING

BACKGROUND OF THE INVENTION

1. Field of the Invention

The present invention relates to electronic apparatus especially configured for computing fast Fourier transformations of such time-variable functions as electronic signals.

2. Discussion of the Prior Art

Rapid analysis of time-variable functions is important in many industry and military operations, such as in spectroscopy and SONAR. If the time-variable functions under consideration are simple harmonics of the form "a cos wt" or "b sin wt", the differential equations required for analyzing the functions, or determining system response thereto, can be quite easily and quickly solved.

However, not all commonly encountered time-variable functions, such as electronic signals or forces, are of such simple cosine or sine form, and analysis of these more complicated functions is thus more difficult and time consuming. Nevertheless, if, as is often possible, the function in question can be mathematically represented by an equivalent series summation of individual cosine and sine terms, the analysis can be greatly simplified, inasmuch as each cosine and sine term can be handled separately. Such equivalent representation or such transformation of complicated time-variable functions, f(t), when possible, is usually by the Fourier expansion:

$$f(t) = \tfrac{1}{2} a_0 + a_1 \cos t + a_2 \cos 2t + \ldots + \quad (1)$$
$$a_n \cos nt + b_1 \sin t + b_2 \sin 2t +$$
$$\ldots + b_n \sin nt,$$

or by one of the equivalent, summation or continuous integral forms. In the Fourier equation, f(t) is the time variable function to be transformed, and the coefficients $a_0, a_1 \ldots a_n, b_1 \ldots b_n$ are determined by the Euler formulas:

$$a_0 = \frac{1}{\pi} \int_I f(t)dt, \quad (2)$$

$$a_n = \frac{1}{\pi} \int_I f(t)\cos nt\, dt, \text{ and} \quad (3)$$

$$b_n = \frac{1}{\pi} \int_I f(t)\sin nt\, dt. \quad (4)$$

Integration of equations (2)–(4) is over an appropriate time interval, I, usually one period of the function f(t). Using equations (1)–(4), such commonly-encountered electronic signals as square waves or sawtooth waves can be represented by a series of cosine and sine waves of various frequencies and amplitudes.

In actual practice, however, many important time-variable functions cannot readily be converted to a Fourier series, equation 1, in the above-described manner. In other words, such functions have a repetition interval which is infinitely long. To resolve such functions into a series of sine and cosine terms of various frequencies, it is necessary to extend the period I over which the Fourier coefficients are calculated to infinity. Thus, equations 2, 3, and 4 become:

$$g(\omega) = \tfrac{1}{2}\pi \int_{-\infty}^{+\infty} f(t)^{-i\omega t}dt \quad (4A)$$

$g(\omega)$ is defined as the continuous Fourier transform of f(t). The signal f(t) may be obtained by the inverse transformation of (4A):

$$f(t) = \int_{-\infty}^{\infty} g(\omega)e^{i\omega t}d\omega \quad (4B)$$

Equations (4A) and (4B) are referred to as Fourier transform pairs.

In addition to lacking periodicity, many time-variable functions are too complicated for the function, f(t), to be expressed in a manner enabling practical solution of the Euler formulas. More sophisticated techniques known as "discrete Fourier transformations" (DFT's) are, therefore, required to enable analysis of such complicated functions. By use of DFT techniques, a complicated time-variable function, S(t), is sampled at short time intervals so as to provide, at each sampling time, an amplitude reading, $S_n$. Ordinarily, a set of "N" $S_n$ values, $S_0, S_1, S_2 \ldots S_{N-1}$, are obtained for each signal "period" or time block of duration T, so that the sampling time interval is equal to T/N. A corresponding set of Fourier terms, $f_m$, called the Fourier spectrum of the signal, is obtained from the set of $S_n$ data by application of the known DFT equation:

$$f_m = \frac{1}{N} \sum_{n=0}^{N-1} S_n [e^{-i2\pi/N}]^{nm} \quad (5)$$

the $[e^{-i2\pi/N}]^{nm}$ term is defined as the $W^{MN}$ term representing a series of sine and cosine terms, according to the relationship:

$$e^{i\omega t} = \cos \omega t + i \sin \omega t \quad (6)$$

$$e^{-i\omega t} = \cos \omega t - i \sin \omega t \quad (6a)$$

The $[e^{-i2\pi/N}]^{nm}$ term in Equation (5) is also seen to represent a matrix and Equation (5) is thus usually expressed more conveniently as:

$$f_m = \sum_{n=0}^{N-1} S_n [W mn] \quad (7)$$

in which $[W_{nm}]$ represents an N by N matrix. Fully written out in matrix form, Equation (7) becomes:

$$\begin{vmatrix} f_0 \\ f_1 \\ \cdot \\ \cdot \\ \cdot \\ f_{N-1} \end{vmatrix} = \begin{vmatrix} W_{00} & W_{01} & \ldots & W_{0N-1} \\ W_{10} & \ldots & & \\ W_{20} & \ldots & & \\ \ldots & & & \\ \ldots & & & \\ W_{N-1\,0} & \ldots & & W_{N-1\,N-1} \end{vmatrix} \cdot \begin{vmatrix} S_0 \\ S_1 \\ \cdot \\ \cdot \\ \cdot \\ S_{N-1} \end{vmatrix} \quad (8)$$

Since from Equation (8), Wmn is seen to be an N by N matrix, $N^2$ computations of the type $W_{00} \cdot S_0$, $W_{01} \cdot S_1$, $\ldots W_{N-1\,N-1} \cdot S_{N-1}$ are required to obtain the Fourier spectrum, fm. However, as many as $4N^2$ individual computations may actually be required, as both $W_{m_n}$ and $S_n$ may be complex numbers of the form $(a \pm i\, b)$. When N is large, as is usually necessary to achieve a good resolution of the signal, $S(t)$, the $4N^2$ number of computations will, of course, be very large. For example, when N is equal to 16,000, in excess of a billion computations may be required to obtain the Fourier spectrum for each signal block analyzed. If an associated computation rate of one million per second is assumed, over a quarter of an hour of computation time would be required. Computation times of such length are clearly unacceptable when substantially real-time signal analysis is required.

Because of the very large number of computations required to obtain the Fourier spectrum from matrix Equation (8), so-called "fast Fourier transform" (FFT) techniques have been developed which substantially reduce the number of computations, and thus the computation time, required to obtain a Fourier spectrum, $f_m$. It has been shown, (for example, at page 144 of "Digital Signal Processing, Theory, Design and Implementation", by Peled and Liu, published by John Wiley and Sons, 1976), that the $W_{mn}$ matrix can be reduced to a series of smaller matrices in a manner reducing the total number of computations from $4N^2$ to only $N \log_2 N$. Thus, for the exemplary N equal to 16,000, the number of computations is reduced to under 200,000. Computation times, at the assumed rate of a million computations per second, are accordingly reduced to only about 200 milliseconds. Such FFT techniques, and apparatus for implementing them, are obviously very important when substantially real-time signal analysis is needed.

Known FFT techniques effectively replace the $W_{mn}$ matrix of Equation (8) by a series of "$\alpha$" smaller, sparse matrices, the number $\alpha$ being of obtained from the relationship:

$$N = 2^\alpha, \qquad (9)$$

So that for the assumed N equal to about 16,000, $\alpha$ is equal to 14. Equation (8) is thereby reduced to the following expression:

$$f_m = \sum_{n=0}^{N-1} [M^{\alpha-1}] \cdot [M^{\alpha-2}] \ldots [M^0]\, S_n, \qquad (10)$$

As is well known, matrix operation of Equation (10) is performed serially from right to left; with each subsequent matrix operating on the previous matrix product.

Typically, and as described in greater detail below, each matrix operation of Equation (10) can be mathematically represented by a sequence of N/2 pairs of operations, termed "butterfly" operations because of their representational appearance. The Fourier spectrum is thus obtained through $\alpha$ sequences of N/2 pairs of butterfly operations.

These FFT butterfly operations can be made by various means; as an illustration, high speed, general purpose computers can be programmed to perform the required computations. However, special purpose FFT circuits, generally termed FFT's or FFT computers are preferred for the reason that FFT's are usually smaller and less expensive than general purpose computers of comparable FFT computational performance.

Because, in part, of the increased usage of FFT's and the continued advancement in the very large scale integration (VLSI) art, improvements over heretofore known FFT's are highly desirable. Additional reductions in FFT size and weight are important for many applications, such as aircraft, satellites and missiles. Comparable or improved FFT performance, but at lower cost, is also important to many applications, as is compatibility of the FFT to VLSI technology.

Therefore, an object of the present invention is to provide, for specified performance criteria, an FFT which is substantially smaller and/or cheaper than heretofore available FFT's.

An additional object of the present invention is to provide an FFT in which the clock timing schedule for receiving data required for the butterfly computations is independent of, or decoupled from, the clock timing schedule for performing the computations.

Other objects, features and advantages of the present invention will be readily apparent from the following detailed description thereof when taken in conjunction with the accompanying drawings.

SUMMARY OF THE INVENTION

Fast Fourier transform (FFT) apparatus is provided for obtaining the Fourier spectrum, $f_m$, from a sequence of N time-variable function samples, $S_n$, in accordance with the general matrix equation:

$$f_m = \sum_{n=0}^{N-1} S_n\, [W_{mn}], \qquad [7]$$

and the equivalent, expanded matrix equation:

$$f_m = \sum_{n=0}^{N-1} [M^{\alpha-1}] \cdot [M^{\alpha-2}] \ldots [M^0]\, S_n, \qquad [10]$$

which is obtained by factoring the matrix $W_{mn}$ into a series of $\alpha$ sparse matrices $[M^{\alpha-1}]$, $[M^{\alpha-2}]$, ..., $[M^0]$, the number $\alpha$ being determined in accordance with the relationship $N = 2^\alpha$. Each of the sparse matrices $[M^{\alpha-1}]$, $[M^{\alpha-2}]$, ..., $[M^0]$ is equivalent to the operation of N/2 pairs of butterfly operations of the general form:

$$A(x)' = A(x) + W_{(z)} \cdot A(x), \text{ and} \qquad [13]$$

$$A(y)' = A(x) - W_{(z)} \cdot A(x), \qquad [14]$$

wherein $A(x)$ and $A(y)$ are data terms which include the signal data $S_n$, and $W_{(z)}$ is the appropriate matrix term of the associated sparse matrix, the sequence of $A(x)$, $A(y)$ and $W_{(z)}$ terms for each of the $\alpha$ sets of N/2 pairs of operations being predetermined and based on the numbers $\alpha$ and N.

According to the present invention, the fast Fourier transform apparatus includes FFT data processing means for computing a first set of the N/2 pairs of butterfly operations. The processing means are connected for receiving the $S_n$ data and include first memory means for storing $A(x)$ and $A(y)$ data, including the $S_n$ data, and second memory means for storing predetermined $W_{(z)}$ data. Also included in the processing means are timing means for providing a clock of frequency, f, and address generating means for locating $A(x)$, $A(y)$ and $W_{(z)}$ data in the first and second memories. Further comprising the data processing means are butterfly computing means for receiving the $A(x)$, $A(y)$ and $W_{(z)}$ data from the two data memories, in accordance with a first timing schedule and for reading the data to sequentially perform the N/2 pairs of butterfly operations in accordance with a second timing schedule. The butterfly computing means include multiplying/accumulating means for receiving A(y) and W$_{(z)}$ data, for performing complex W$_{(z)}$·A(y) multiplication and for accumulating the results thereof; adding/subtracting means for receiving A(x) and the computed W$_{(z)}$·A(y) data and for performing complex A(x)+W(z)·A(y) addition and complex A(x)−W$_{(z)}$·A(y) subtraction therof; microcoding means for establishing and enabling the above-mentioned first and second clock timing schedules and data schedule decoupling (buffering) means connected between the first memory means and the multiplying/accumulating means and between the first memory means and the adding/subtracting means for buffering the flow of A(x) and A(y) data therebetween so as to operationally decouple the first timing schedule from the second timing schedule, thereby enabling the butterfly computing means to be computing at least two different pairs of butterfly operations at the same time.

The FFT further comprises means enabling iterative computing of the $\alpha-1$ subsequent sets of N/2 pairs of butterfly computations, by using the N/2 pairs of A(x)' and A(y)' output complex numbers from any one set of butterfly computations as the input set of A(x) and A(y) complex numbers for the next-in-sequence set of N/2 pairs of butterfly computations, and for outputting the last-in-sequence set of N/2 pairs of A(x)' and A(y)' complex numbers as the Fourier spectrum, $f_m$.

The butterfly computing means are configured for computing the first of an associated pair of the butterfly operations and outputting the A(x)' and A(y)' results thereof in between about 14 and about 22 clock intervals, and for thereafter outputting subsequent, associated pairs of A(x)', A(y)' complex butterfly computational results at a rate of about every four (4) to about every eight (8) clock intervals, and preferably no more than about every four (4) clock intervals, until all $\alpha$ sets of N/2 pairs of butterfly computations have been completed and the Fourier spectrum, $f_m$, is obtained.

Preferably the decoupling means are also connected between the multiplying/accumulating means and the adding/subtracting means for buffering the flow of W$_{(z)}$·A(y) data therebetween so as to enable the decoupling of multiplying/accumulating and adding/subtracting timing schedule portions of the second timing schedule from one another.

According to one embodiment of the invention, the means for enabling iterative computing of the $\alpha-1$ subsequent sets of N/2 pairs of butterfly computations include means for feeding the A(x)' and A(y)' data output from the adding/subtracting means back to the first memory means, thereby forming a "wraparound"-type FFT. Means are accordingly provided for counting the number of wraparound butterfly computational passes so as to enable the A(x)' and A(y)' complex numbers of the last-in-sequence pass to be outputted as the desired Fourier spectrum, $f_m$.

In a variation FFT, the means for enabling iterative computing of the $\alpha-1$ subsequent sets of N/2 butterfly computations include a plurality of similar FFT data processing means connected in serial order, with the output of the adding/subtracting means of one FFT data processing means being connected to the first memory means of the next-in-sequence FFT data processing means, so that the computed A(x)' and A(y)' output data from one FFT data processing means is thereby used as the A(x) and A(y) data for the butterfly computations of the next-in-sequence FFT data processing means. Preferably, the number of FFT data processing means connected in serial order is equal to $\alpha$, the computed A(x)' and A(y)' data from the butterfly computation made by the last-in-sequence data processing means being the desired Fourier spectrum, $f_m$.

Preferably, the data schedule decoupling means are comprised of 4 by 4, dual port registers which permit the simultaneous, temporary storing of as many as four different data values.

In this manner, idle time of the multiplying/accumulating means and the adding/subtracting means can be minimized without requiring a large number of circuits, thereby enabling fast, highly efficient FFT operation at a relatively inexpensive cost. Also by using a small number of circuits, the FFT according to the present invention is adaptable to very large scale integration (VSLI) techniques. However, even without adaptation of the FFT to VSLI, the FFT is comparatively small and light in weight as compared to known FFT's of comparable performance, making the present FFT well suited for such critical applications as in airborne equipment for missiles, satellites and aircraft.

BRIEF DESCRIPTION OF THE DRAWINGS

A better understanding of the present invention may be had from a consideration of the following detailed description, taken in conjunction with the accompanying drawings in which:

FIG. 4 shows, in block diagram form, a variation FFT in which elements thereof are arranged in an inseries or cascade configuration;

FIG. 5 shows, in diagrammatic form, reordering of the $S_n$ signal data according to a bit reversal process and diagrams a sequence of three passes or sets of N/2 pairs of butterfly operations by means of which the Fourier spectrum, $f_m$, is generated from the input signal data, $S_n$;

FIG. 7 is a clock timing diagram showing the data transferring and computing schedules which occur within a 14 clock interval cycle;

FIG. 15 is a timing diagram for the variation FFT of FIG. 13.

DESCRIPTION OF THE PREFERRED EMBODIMENT

Figure 1:
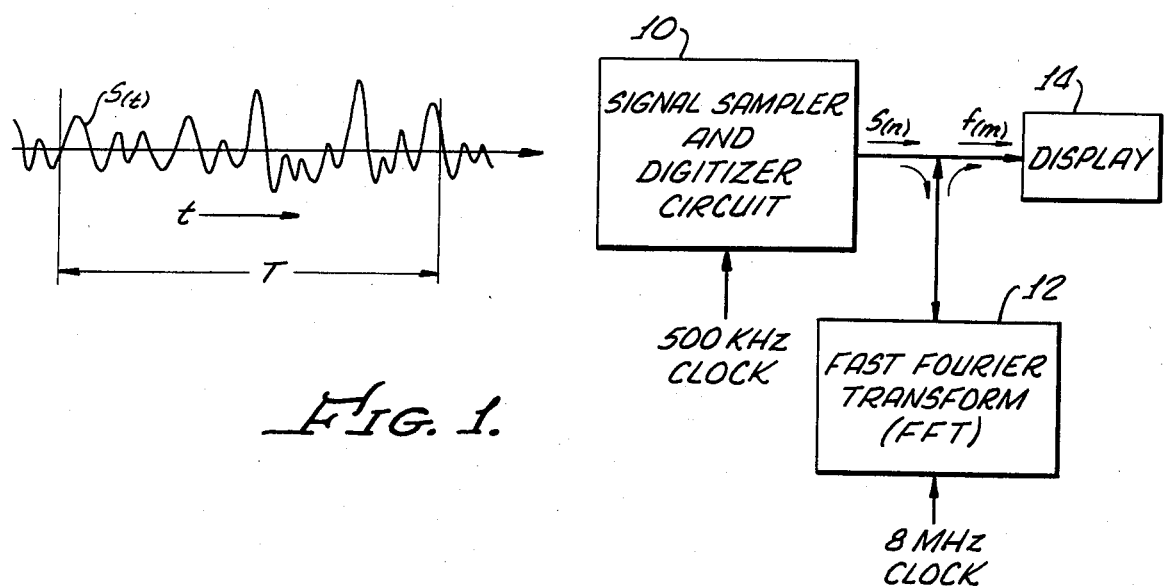
FIG. 1 shows, in block diagram form, an exemplary system which employs the fast Fourier transform (FFT) according to the present invention to obtain the Fourier spectrum, $f_m$, of a time-variable signal S(t)

The present invention can be better understood by a further consideration of existing DFT and FFT technology. As shown in FIG. 1, a time-variable signal S(t), for example, an interferometer spectroscopy electric signal, is fed to a conventional signal sampler and digitizer 10, which samples, over a selected time interval "T", the second S(t) and provides to an FFT 12 a sequence of N signal samples, $S_n$. Using the $S_n$ data to solve matrix equation (10), FFT 12 generates the desired Fourier spectrum, $f_m$, and feeds the result to an exemplary display 14. Signal sampler and digitizer 10 is shown provided with a 500 KHz clock and FFT 12 is shown provided with an 8 MHz clock, although other frequencies may obviously be used.

Figure 2A:
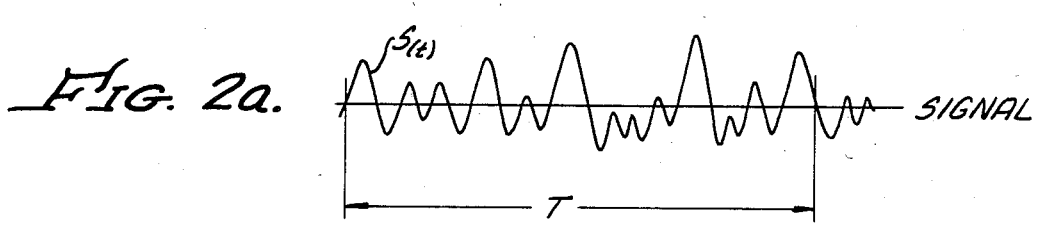
FIG. 2 illustrates the manner in which the time variable signal, S(t) is sampled to generate a series of N signal samples $S_n$, FIG. 2(a) showing the signal S(t), FIG. 2(b) showing generation of a series of N pulses of unit height and FIG. 2(c) showing operation of the unit pulses on the signal S(t) to provide the $S_n$ data.

Signal sampler and digitizer 10 operates on input signal, S(t) to obtain the signal samples, $S_n$, in accordance with the following known equation:

$$S_n = \int_0^T S(t) \cdot \delta(t - n\Delta t) dt, \quad (11)$$

in which $\delta(t - n\Delta t)$ is the "Dirac delta function". As indicated in FIG. 2(a), a time interval or block, T, of the signal S(t) is selected for analysis: T may, for example, be about 30 milliseconds. Within signal sampler and digitizer 10, a spike or sharp pulse of unit height is generated at each $\Delta t$ time interval, with $\Delta t$ being equal to the sample time, T, divided by the number, N, of pulses generated per period, as established by satisfying the so-called "Nyquist Criteria":

$$r(s) \geq 2f(max), \quad (12)$$

in which r(s) is the sampling rate and f(max) is the maximum signal frequency in time interval, T. To obtain good characterization of the signal, S(t), Equation (12) dictates that the faster the signal varies with time, the faster the sampling rate must be. In typical cases N may be selected to be about 16,000.

Figure 2B:
Figure 2C:
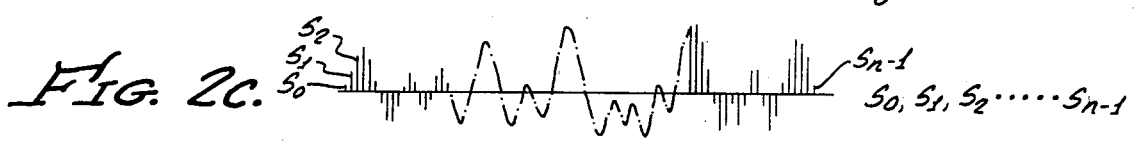

Over the interval T, the signal, S(t), is multiplied by the N generated unit pulses (FIG. 2(b)), to thereby obtain a sequence of N signal amplitudes, $S_n$, spaced at $\Delta t$ time intervals. The $S_n$ data ($S_0$, $S_1$, ... $S_{N-1}$) is fed, typically in parallel bit order, to FFT 12. Using the $S_n$ data, FFT 12 computes the Fourier spectrum, $f_m$, of signal S(t) by performing the matrix operations of Equation (10). In the exemplary FFT "wraparound" configuration of FIG. 3, the results of each sequential matrix operation (pass) are fed back into the input for a next sequential matrix pass until after an "$\alpha$" number of passes ($\alpha$ being defined by $N = 2^\alpha$), the Fourier spectrum, $f_m$, is obtained and outputted.

Each of the $\alpha$ matrix passes, as above noted, comprises a set of N/2 pairs of "butterfly" operations. Pictorial representations of these butterfly operations are shown in FIG. 5 for the greatly simplified example of $\alpha$ equal to 3 (corresponding to N equal to only 8). As such, FIG. 5 can be seen to correspond generally to FIG. 3.3, at page 148, of the above-cited Digital Signal Processing text.

As depicted in FIG. 5, the first set of butterfly computations operate, in the manner of a sparse (mostly zero) matrix, on the $S_n$ signal data to yield a set of N complex numbers, which may be defined as "$B_n$" terms ($B_0$, $B_1$ ... $B_{N-1}$). In a similar manner, the second (next-in-sequence) butterfly pass operates on the $B_n$ data to provide a new set, $C_n$, of complex numbers, $C_0$, $C_1$ ... $C_{N-1}$, upon which the third (last-in sequence) butterfly pass operates to provide, (for $\alpha$ equals 3), the complex Fourier spectrum, $f_m$ ($f_0$, $f_1$ ... $f_{N-1}$). To obtain the correct Fourier spectrum, $f_m$, from the input data, $S_n$, in $\alpha$ butterfly passes in the above-described manner, reordering of the $S_n$ data sequence in accordance with a binary bit reversal process (FIG. 5) is, however, necessary. By such process, each $S_n$ term is first represented by a binary number corresponding to the subscript number of the term. That is, $S_0$ (for N equal to 8) is represented by the binary zero number "000", $S_1$ is represented by the binary one number "001", $S_2$ is represented by "010", $S_3$ is represented by "001", $S_4$ is represented by "100", and so forth. Then the binary number representation is reversed so that the "001" representation of $S_1$ becomes "100", the "100" representation of $S_4$ becomes "001" and so on. Symmetrical binary representations, such as the "000" and "010" corresponding to $S_0$ and $S_3$, respectively, will, of course, remain unchanged by the bit reversal process. Finally, the $S_n$ data is reordered according to the reversed binary bit representation of the $S_n$ series. As a result, the normal $S_n$ sequence of $S_0$, $S_1$, $S_2$, $S_3$, $S_4$, $S_5$, $S_6$ and $S_7$ (for N equals 8) is reordered to: $S_0$, $S_4$, $S_2$, $S_6$, $S_1$, $S_5$, $S_3$ and $S_7$. These signal sample values are stored in memory locations $A_0$, $A_1$, $A_2$, $A_3$, $A_4$, $A_5$, $A_6$ and $A_7$, respectively, as shown in FIG. 5. It is emphasized, however, that only the order of the $S_n$ terms changed; the actual data of each $S_n$ term remains unchanged.

Although the bit reversed ordering procedure for the $S_n$ data has, for illustrative purposes and for simplicity, been described (and shown in FIG. 5) for N equal to only 8, the bit reversal reordering procedure is applicable for N equal to any number greater than about four (4). Four is not a significant limitation, however, since such small N's have not been found to be practical interest in FFT technology.

After reordering the $S_n$ data in the above-described manner, $\alpha$ sequential sets (passes) of butterfly computations are made, each pass requiring the performing of N/2 pairs of butterfly operations in accordance with the two general equations:

$$A(x)' = A(x) + W_{(z)} \cdot A(y) \text{ and} \quad (13)$$

$$A(y)' = A(x) - W_{(z)} \cdot A(y). \quad (14)$$

For the first butterfly pass, the A(x), A(y) terms of equations (13) and (14) are appropriately selected pairs of the reordered $S_n$ data and $W_{(z)}$ is a corresponding phase angle term selected from a $W_{(z)}$ "library". In butterfly equations (13) and (14), "x" and "y" can be considered as "pointers" into a first data memory or memory means 16 which holds at least the $S_n$ data and "z" may be considered as a "pointer" into a second data memory or memory means 18 which holds the library of $W_{(z)}$ data. The resulting set of N/2 pairs of complex $A(x)'$, $A(y)'$ data are then used, in appropriately selected pairs, as the $A(x)$ and $A(y)$ terms for the next-in sequence set of N/2 pairs of butterfly computations. The values of x, y and z specify the memory address locations where the $A(x)$, $A(y)$, $W(z)$ data, respectively, are stored. The predetermined $W(z)$ data are independent of signal sample data. Specifically, $W(z) = W^z$. In equations 13 and 14, $z = (m)(n)$. Thus $W(z) = W^z = W^{mn}$.

In the ensuing discussion, it should be understood that $W(z)$ represents a function z, which is in fact equal to $W^z$. Note, however, that because of the transposition of matrix elements which occurs when matrix (8) is factored into sparse matrices, in general, $W_{mn} \neq W^{mn}$.

As described below, the $A(x)$, $A(y)$ data and $W_{(z)}$ data for each pair of butterfly equations (13) and (14) of each of the $\alpha$ butterfly passes are particularly selected so that the last-in-sequence $A(x)'$ and $A(y)'$ data is, in fact, equal to the Fourier spectrum, $f_m$. The requisite selection of several exemplary pairs of $A(x)$ and $A(y)$ terms is depicted in FIG. 5 at reference numbers 20, 22, 24 and 26, the particular outlined shape of the selected pairs giving rise to the descriptive term "butterfly".

As shown by FIG. 5, pair selection of the $A(x)$, $A(y)$—actually the $S_n$—data for the first butterfly pass is $S_0$, $S_4$; $S_2$, $S_6$; $S_1$, $S_5$ and $S_3$, $S_7$. This data set is stored in memory locations $A_0$, $A_1$, $A_2$, $A_3$, $A_4$, $A_5$, $A_6$, and $A_7$, respectively. The $W_{(z)}$ term for each of these $S_n$ data pairs is $W_{08}$, which is usually shortened to $W_0$.

The first N/2 (4) pairs of butterfly Equations (13) and (14) for N equals 8 thus become:

$$A(x)' = A_0 + W^0 \cdot A_1 \equiv B_0 \tag{15}$$

$$A(y)' = A_0 - W^0 A_1 \equiv B_1 \tag{16}$$

$$A(x)' = A_2 + W^0 \cdot A_3 \equiv B_2 \tag{17}$$

$$A(y)' = A_2 - W^0 \cdot A_3 \equiv B_3 \tag{18}$$

$$A(x)' = A_4 + W^0 \cdot A_5 \equiv B_4 \tag{19}$$

$$A(y)' = A_4 - W^0 \cdot A_5 \tag{20}$$

$$A(x)' = A_6 + W^0 \cdot A_7 \equiv B_6 \tag{21}$$

$$A(y)' = A_6 - W^0 \cdot A_7 \equiv B_7 \tag{22}$$

As further shown in FIG. 5, by using a different pairing of the $B_n$ data, and using $W_{(z)}$ equal to $W^0$, $W^2$, $W^0$, $W^2$ ($W^0$, $W^2$, $W^0$, $W^2$), respectively, the second, next-in-sequence set of N/2 (4) pairs of butterfly computations becomes:

$$A(x)' = B_0 + W^0 \cdot B_2 \equiv C_0 \tag{23}$$

$$A(y)' = B_0 - W^0 \cdot B_2 \equiv C_2 \tag{24}$$

$$A(x)' = B_1 + W^2 \cdot B_3 \equiv C_1 \tag{25}$$

$$A(y)' = B_1 - W^2 \cdot B_3 \equiv C_3 \tag{26}$$

$$A(x)' = B_4 + W^0 \cdot B_6 \equiv C_4 \tag{27}$$

$$A(y)' = B_4 - W^0 \cdot B_6 \equiv C_6 \tag{28}$$

$$A(x)' = B_5 + W^2 \cdot B_7 \equiv C_5 \tag{29}$$

$$A(y)' = B_5 - W^2 \cdot B_7 \equiv C_7 \tag{30}$$

By using a still different pairing of the $C_n$ data and by selecting $W_{(z)}$ equal to $W^0$, $W^1$, $W^2$ and $W^3$ ($W^0$, $W^1$, $W^2$, $W^3$), respectively, the third and last-in-sequence set of N/2 pairs of butterfly equations becomes:

$$A(x)' = C_0 + W^0 \cdot C_4 \equiv f_0 \tag{31}$$

$$A(y)' = C_0 - W^0 \cdot C_4 \equiv f_4 \tag{32}$$

$$A(x)' = C_1 + W^1 \cdot C_5 \equiv f_1 \tag{33}$$

$$A(y)' = C_1 - W^1 \cdot C_5 \equiv f_5 \tag{34}$$

$$A(x)' = C_2 + W^2 \cdot C_6 \equiv f_2 \tag{35}$$

$$A(y)' = C_2 - W^2 \cdot C_6 \equiv f_6 \tag{36}$$

$$A(x)' = C_3 + W^3 \cdot C_7 \equiv f_3 \tag{37}$$

$$A(y)' = C_3 - W^3 \cdot C_7 \equiv f_7 \tag{38}$$

When arranged in the order $f_0, f_1, f_2 \ldots f_7$, the computational results of the last-in-sequence pass are the Fourier spectrum, $f_m$. For disclosure purposes, the manner of selecting the $A(x)$, $A(y)$ and $W_{(z)}$ data for each butterfly computations for each butterfly pass is set forth below under the heading "$A(x)$, $A(y)$ and $W_{(z)}$ SELECTION". However, the described data selection process is not part of the present invention and is considered known to those skilled in the FFT art.

Figure 3:
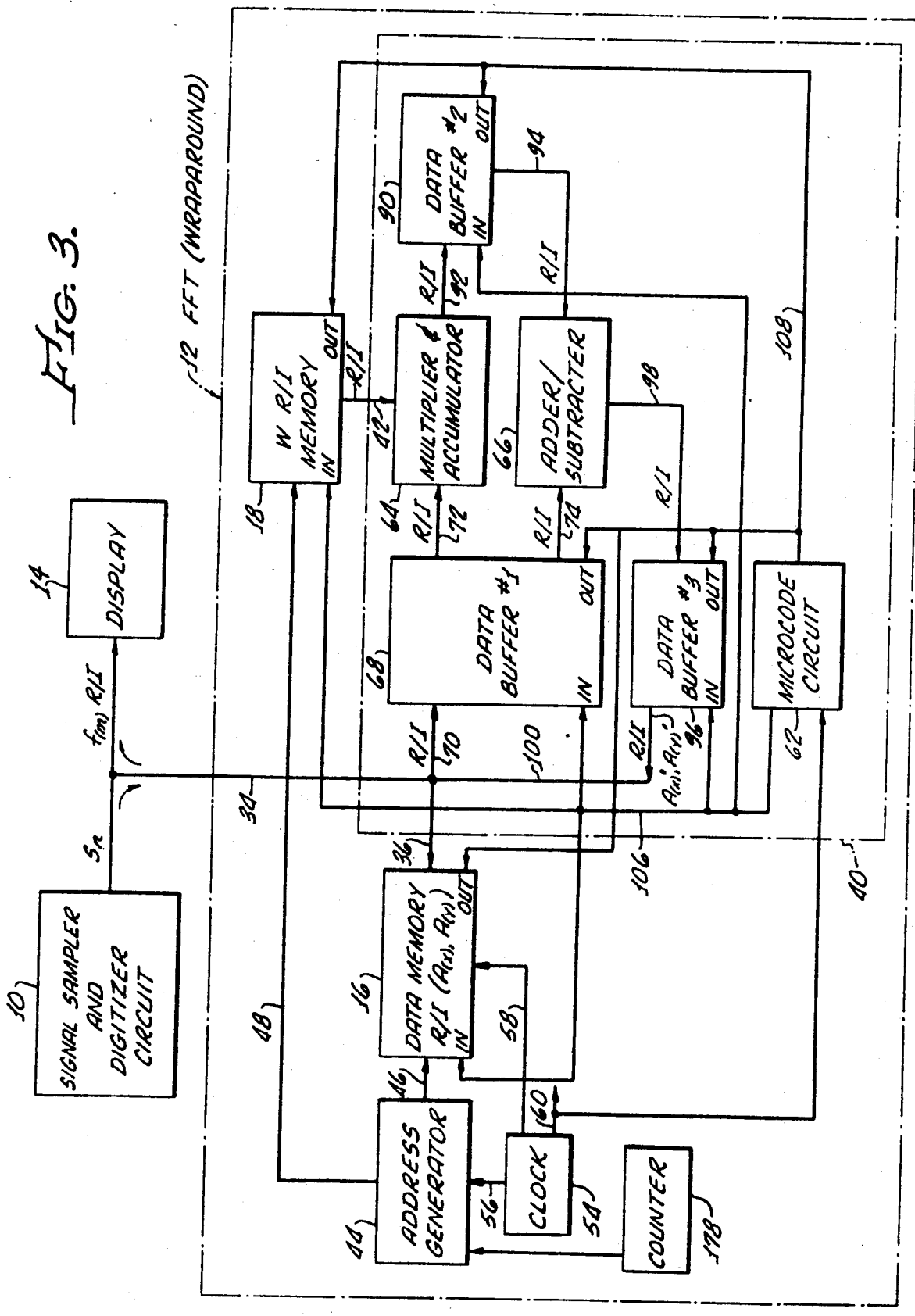
FIG. 3 shows, in block diagram form, elements of the FFT of FIG. 1, a "wraparound" version of the FFT being illustrated.

Shown in block diagram form in FIG. 3, FFT 12, according to the wraparound version of the present invention, includes first data memory 16 which receives and stores $A(x)$ and $A(y)$ data used in the butterfly computations. As such, first memory 16 is connected for receiving the initial signal data, $S_n$, from signal sampling and digitizing means 10 via lines 32, 34 and 36. For the wraparound-type of FFT 12 depicted in FIG. 3, the first memory 16 is also connected for receiving, and is operative for storing, the computed $A(x)'$ and $A(y)'$ data from each butterfly pass. Included in FFT 12 is second data memory 18 which is configured for storing the library of non-zero $W_{(z)}$ data. Although first and second memories 16 and 18 are shown as separate data memories, they may alternatively comprise different pairs of a common memory.

Included in FFT 12 are data processing means 40 which perform the butterfly computations of Equations (13) and (14). As shown in FIG. 3, data processing means 40 are connected, by line 36, to first memory 16 for receiving $A(x)$ and $A(y)$ (including $S_n$) data therefrom and, by a line 42, to second memory 18 for receiving $W_{(z)}$ data therefrom. For convenience and clarity, lines 36 and 42, as well as other FFT data transmission lines, are shown in the various Figures as single lines. It should be understood, however, that such data transmission lines, from and within FFT 12, are typically multiple lines enabling data to be transmitted in parallel bit form. Accordingly, lines 36 and 42 (and other data lines) may, for example, comprise 16 or 32 parallel lines enabling the transmission of 16 or 32 parallel bit data Locating of $A(x)$, $A(y)$ and $W_{(z)}$ data in first and second memories 16 and 18 is enabled by address generating means 44. Lines 46 and 48, respectively, connect address generating means 44 to first and second memories 16 and 18.

Timing for FFT 12 is provided by a clock or as timing means 54. Although clock 54 is connected throughout FFT 12 so as to enable sychronous operation, clock 54 is shown, again for convenience and clarity, connected only to address generating means 44 by line 56, to first memory 16 by line 58 and by a line 60 to microcoding means 62, (described below).

Computing means 40, as shown in FIG. 3, include a conventional multiplier and accumulator (MAC) or multiplying/accumulating means 64 and conventional adding/subtracting means 66. MAC 64 is connected and operative for performing the complex $W_{(z)} \cdot A(y)$ multiplication portion of butterfly computations (13) and (14) and for accumulating the resulting real and imaginary terms. Adding/subtracting means 66 are connected and operative for completing the butterfly computations of Equations (13) and (14) by separately adding and subtracting the complex $W_{(z)} \cdot A(y)$ *computational results from MAC 64 to and from A(x) to thereby provide the complex, A(x)' and A(y)' butterfly computational results.*

Importantly and accordingly to the present invention, the computing means 40 include first data buffering means 68 which are connected to first memory line 36 by line 70 and to MAC 64 and adding/subtracting means 66 by respective lines 72 and 74. First buffering means 68 are operative, as more particularly described below, for buffering the flow of A(y) data from first memory 16 to MAC 64, as well as the flow of A(x) data from the first memory to adding/subtracting means 66. Similarly, second data buffering means 90 are interconnected, by lines 92 and 94, between MAC 64 and adding/subtracting means 66 for buffering the flow of $W_{(z)} \cdot A(y)$ complex data from the former to the latter. Third data buffering means 96 are also included, being connected by lines 98 and 100 between adding/subtracting means 66 and first memory line 36, for buffering the flow of computed A(x)' and A(y)' complex data from the adding/subtracting means back to the first memory for use in subsequent butterfly computations.

Microcoding means 62 are connected to each of the first and second memories 16 and 18, first, second and third buffering means 68, 90 and 96, as well as to MAC 64 and adding/subtracting means 66 by an "IN" line 106 and an "OUT" line 108 (for the sake of clarity in FIG. 3, interconnection between microcoding means 62 and all the mentioned elements of FFT 12 is not shown). In conjunction with clock 54, microcoding means 62 are operative for establishing data write and read timing schedules in FFT 12. As such, microcoding means 62, in conjunction with first and second data buffering means 68 and 90, enable very efficient data "pipelining" in FFT 12 which which minimizes the idle time of MAC 64 and adding/subtracting means 66. As a direct consequence, each pair of the A(x)', A(y)' butterfly computations of equations (13) and (14) is performed in 14 clock intervals. Furthermore, once the data pipeline is filled, the A(x)', A(y)' complex results of subsequent pairs of butterfly computations is obtained and outputted at a rate of every 4 clock intervals, until the entire $\alpha$ sets of N/2 pairs of butterfly computations has been made and the Fourier spectrum, $f_m$, is obtained. This very efficient operation, using a minimum number of FFT circuit elements and, hence, at low cost, is enabled by data buffering means 68, 90 and 96, in conjunction with microcoding means 62.

Operation is such that, after receiving from first memory 16 a selected pair of A(x) and A(y) data (including $S_n$ data for the first butterfly pass), first data buffering means 68 retain the data as long as the data is required for the butterfly computations of equations (13) and (14). When any of the temporarily retained A(x) and A(y) data is no longer needed, the data is replaced with new A(x) and A(y) data (from first memory 16). For a subsequent pair of butterfly computations, after any A(x) and A(y) data, (which, except for the original $S_n$ data, is ordinarily in complex number form), is transferred from first memory 16 to first buffering means 68, the vacated data memory space are available (in the case of the wraparoundtype of FFT 12 depicted in FIG. 3) for receiving A(x)' and A(y)' data from adding/subtracting means 66, to be used for butterfly computations in a next butterfly pass.

In a similar manner, after receiving $W_{(z)} \cdot A(y)$ data from MAC 64, second data buffering means 90 retain the data as long as the data is required by adding/subtracting means 66. As soon as any $W_{(z)} \cdot A(y)$ data is no longer needed for an associated pair of butterfly computations, the data can be replaced by new $W_{(z)} \cdot A(y)$ data from a subsequent pair of butterfly computations.

Since the A(x)' and A(y)' data is outputted from adding/subtracting means 66 in four parts (A(x)' real, A(x)' imaginary, A(y)' real and A(y)' imaginary) third data buffering means 96, which receive the A(x)' and A(y)' data from adding/subtracting means 66, retain the data until it can be inputted into vacated data spaces in first memory 16.

It can thus be appreciated that data is inputted into first, second and third data buffering means on a data write or input timing schedule different from the timing schedule according to which the data is read (retrieved) for computational use from the buffering means. As is more particularly discussed below, the data buffering means enable decoupling or relative isolation between the data write input and read clock timing schedules.

Figure 6:
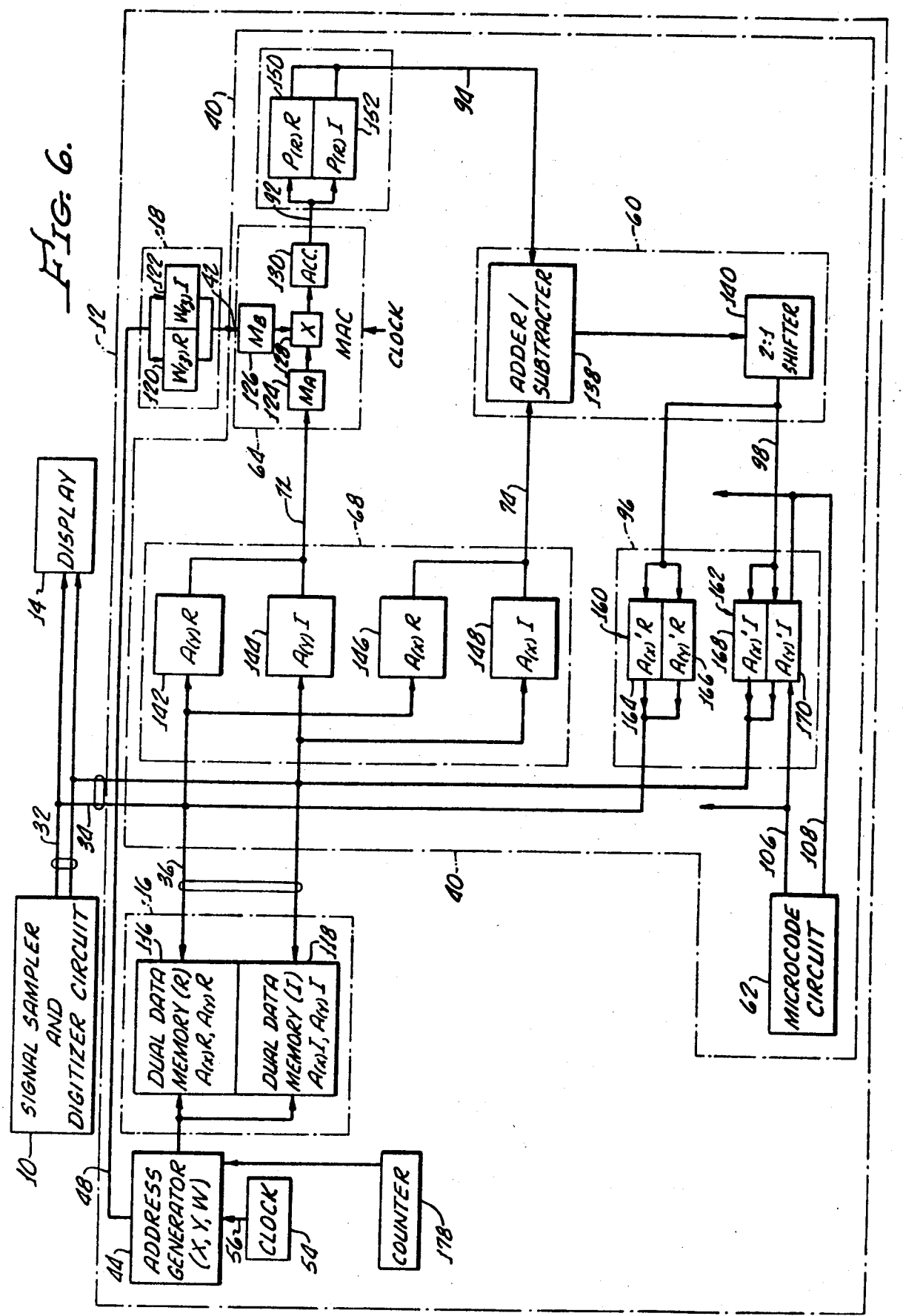
FIG. 6 shows, in block diagram form, a further breakdown of the FFT circuit of FIG. 3, showing elements thereof.

Depicted, in block diagram form, in FIG. 6 is a further circuit breakdown of the FFT 12 apparatus of FIG. 3. As shown, first memory 16 comprises first real data and imaginary data memories 116 and 118, respectively. Although real (data retrieval) and imaginary data memories 116 and 118 are depicted as separate memories, it is to be appreciated that both may comprise different data storage regions or locations of a single data memory. The real data portions of the A(x) and A(y) data are stored in first real memory 116 and the imaginary data portions of the A(x) and A(y) data is stored in first imaginary memory 118. Similarly, second, $W_{(z)}$ data memory 18 comprises second real and imaginary data memories 120 and 122, respectively; these memories may also be part of a single memory. The real data portions of the $W_{(z)}$ data are stored in second real memory 120 and the imaginary data portions of the $W_{(z)}$ data is stored in second imaginary memory 122. Address generating means 44 are operative for establishing data locations (addresses) of real and imaginary A(x), A(y) and $W_{(z)}$ data in real and imaginary memories 116, 118, 120 and 122. First memory 16, may comprise 4 type 2148 integrated circuit and second memory 18 may comprise 2 type 2732 integrated circuits. Address generating means 44 may be of any conventional type.

MAC 64 is shown to comprise MA, MB, multiplying (x) and accumulating circuits or portions 124, 126, 128 and 130, respectively. MA portion 124 receives, via line 72, real and imaginary A(y) data from first data buffering means 68; MB portion 126 of MAC 64 receives, via line 42, real and imaginary $W_{(z)}$ data from respective second real and imaginary $W_{(z)}$ memories 120 and 122. Multiplying portion 128 is connected for receiving the real and imaginary A(y) and $W_{(z)}$ data from the MA and MB portions 124 and 126 and performing the requisite $W_{(z)}R \cdot A(y)R$, $W_{(z)}I \cdot A(y)I$, $W_{(z)}R \cdot A(y)I$ and $W_{(z)}I \cdot A(y)R$ multiplications. The real and imaginary multiplication results from multiplying portion 128 are accumulated in accumulating portion 130 as $[W_{(z)}R \cdot A(y)R - W_{(z)}I \cdot A(y)I] + I[W(z)I \cdot A(a)R + W_{(z)}R \cdot A(y)I]$, which may be defined as the sum of product terms PR+PI (R designating the real term and I, the imaginary term). Preferably, MAC 64 comprises a part number TDC 1010 integrated circuit available from TRW. Because of the data arrangement of the present invention, only a single type TDC 1010 circuit is needed for the butterfly computational rates described herein.

As further shown in FIG. 6, adding/subtracting means include a single adder/subtracter circuit 138, which may be of a 74L5381 type and, connected thereto, a 2:1 multiplexer (shifter) 140 of which may be of a 74L5257 type.

First data buffering means 68 comprise A(y)R, A(y)I, A(x)R and A(x)I data buffers, 142, 144, 146 and 148, respectively, for buffering the flow of corresponding A(y)R, A(y)I, A(x)R and A(x)I data from first memory 16 to MAC 64 and to adding/subtracting means 60, as the case may be. Preferably each of the four buffers 142, 144, 146 and 148 are separate buffers and may be four location, dual port RAMS consisting of 4 type 74L5670 parts. Although FIG. 6, for simplicity, shows each buffer 142, 144, 146 and 148 as comprising a single circuit, such as may be appropriate for four parallel bit input/output, each buffer may, in fact, comprise several such circuits in parallel, four such circuits being, for example, used for 16 parallel bit input/output data.

Second data buffering means 90 is shown as comprising PR and PI buffers 150 and 152, respectively, for buffering the flow of PR and PI data from MAC 64 to adding/subtracting means 60. As shown in FIG. 6, the PR and PI buffers 150 and 152 may comprise different regions of a single, four location, dual port RAM of the type used for A(x), R/I and A(y)R/I buffers 142, 144, 146 and 148 because of shorter data storage times required. As explained for buffers 142-148, PR and PI buffers 150 and 152 may, nevertheless, comprise several similar circuits (not shown) connected in parallel for receiving the PR and PI data in multiple, parallel bit format.

In a similar manner, third data buffering means include TR and TI real and imaginary buffers 160 and 162, respectively, which buffer the flow of real A(x)' and A(y)' data and imaginary A(x)' and A(y)' data from adding/subtracting means 60 to, for the wraparound FFT 12 depicted, first memory means 16. TR buffer 160 comprises A(x)'R portion 164 and A(y)'R portion 166 for separately buffering A(x)'R and A(y)'R data, and TI buffer 162 comprises A(x)'I and A(y)'I portions 168 and 170 respectively, for buffering A(x)'I and A(y)'I data. As shown, A(x)'R and A(y)'R portions 164 and 166 comprise different regions of a single, four location, dual port RAM of the same type used for the previously described buffers 142-148, 150 and 152, as do A(x)'I and A(y)'I portions 168 and 170. Also, as previously described, to provide for parallel bit data handling, several TR and TI buffers 160 and 162 may be used.

The preferred operational schedule for FFT 12 is depicted, in block form, in FIG. 7. Each of the blocks of the diagram lists the events occuring in the corresponding one of the 14 time intervals required for completely performing the pair of butterfly computations of Equations (13) and (14).

As summarized in FIG. 7, the sequence of clock interval events is as follows:

| Clock Interval | |
|---|---|
| 1 | Address generating means 44 establish A(x) R and A(x) I for data first memory 16 (memories 116 and 118) |
| 2 | Address generating means 44 establish A(y) R and A(y) I data for first memory 16 (memories 116 and 118) |
| 3 | (a) A(x) R data is transferred from first memory 16 (memory 116) into A(x) R buffer 146 of first buffering means 68. |
| | (b) A(x) I data is transferred from first memory 16 (memory 118) into A(x) I buffer 148 of first buffering means 68. |
| 4 | (a) A(y) R data is transferred from first memory 16 (memory 116) into A(y) R buffer 142 of first buffering means 68. |
| | (b) A(y) I data is transferred from first memory 16 (memory 118) into A(y) I buffer 144 of first buffering means 68. |
| 5 | (a) A(y) R data is transferred from A(y) R buffer 142 to MA 124 of MAC 64. |
| | (b) $W_{(z)}$ R data is transferred from portion 170 of second memory 18 to MB 126 of MAC 64. |
| | (a) A(y) I data is transferred from A(y) I buffer 144 to MA 124 of MAC 64 |
| | (b) $W_{(z)}$ I data is transferred from portion 122 of second memory 18 to MB 126 of MAC 64. |
| | (c) A(y) R.$W_{(z)}$ R is computed and the product is transferred to PR 150 of second buffer means 90. |
| 7 | (a) A(y) R data is again transferred from A(y) R buffer 142 to MA 124 of MAC 64. |
| | (b) $W_{(z)}$ I data is again transferred from second memory portion 122 to MB 126 of MAC 64. |
| | (c) A(y) I.$W_{(z)}$ I is computed and the product is transferred to PR 150 of second buffering means 90. |
| 8 | (a) A(y) I is again transferred from A(y) I buffer 144 to MA 124 of MAC 64. |
| | (b) $W_{(z)}$ R data is again transferred from second memory portion 120 to MB 126 of MAC 64. |
| | (c) A(y) R.$W_{(z)}$ I is computed and the product is transferred to PI 152 of second buffering means 90. |
| 9 | (a) A(x) R is transferred from A(x) R buffer 146 to adder/subtracter 138 of adding subtracting means 60. |
| | (b) A(x) R.$W_{(z)}$ R minus A(y) I.$W_{(z)}$ I data is transferred from PR 150 to adder/subtracter 138. |
| | (c) A(y) I.$W_{(z)}$ R is computed and the product is transferred to PI 152 of second buffering means 90. |
| | (d) A(x) R and just transferred PR data is summed to obtain A(x)' R, and A(x)' R is transferred to A(x)' R buffer portion 164 of buffer 160. |

| Clock Interval | -continued |
|---|---|
| 10 | (a) A(x) R data is again transferred from buffer 146 to adder/subtracter 138 |
|  | (b) A(y) R·W$_{(z)}$ R minus A(y) I·W$_{(x)}$ I data is transferred from PR 150 to adder/subtracter 138. |
|  | (c) Just transferred PR data is subtracted from A(x) R to obtain A(y)' R, and A(y)'R is transferred from adder/subtracter 138 to A(y)' R buffer portion 166 of buffer 160. |
| 11 | (a) A(x) I data is transferred from A(x) I buffer 148 to adder/subtracter 138. |
|  | (b) A(y) R·W$_{(z)}$ I plus A(y) I·W$_{(z)}$ R data is transferred from PI 152 to adder/subtracter 138 |
|  | (c) A(x) I and just transferred PI data is summed to obtain A(x)' I, and A(x)' I is transferred from adder/subtracter 138 to A(x)' I buffer portion 168 of buffer 162. |
| 12 | (a) A(x) I data is again transferred from A(x) I buffer 148 to adder/subtracter 138. |
|  | (b) A(y) R·W$_{(z)}$ I plus A (y) I·W$_{(z)}$ R data is again transferred from PI 152 to adder/subtracter 138. |
|  | (c) Just transferred PI data is subtracted from A(x) I data to obtain A(y)' I, and A(y)' I is transferred from adder/subtracter to A(y)' I buffer portion 170 of buffer 162. |
| 13 | (a) A(x)' R data is transferred from A(x)' R buffer portion 164 to first memory portion 116 (for use as A(x) R data). |
|  | (b) A(x)' I data is transferred from A(x)' I buffer portion 168 to first memory portion 118 (for use as A(x) I data). |
| 14 | (a) A(y)' R data is transferred from A(y)' R buffer portion 166 to first memory portion 116 (for use as A(y) R data). |
|  | (b) A(y)' I data is transferred from A(y)' I buffer portion 170 to first memory portion 118 (for use as A(y) I data). |

Figure 8:
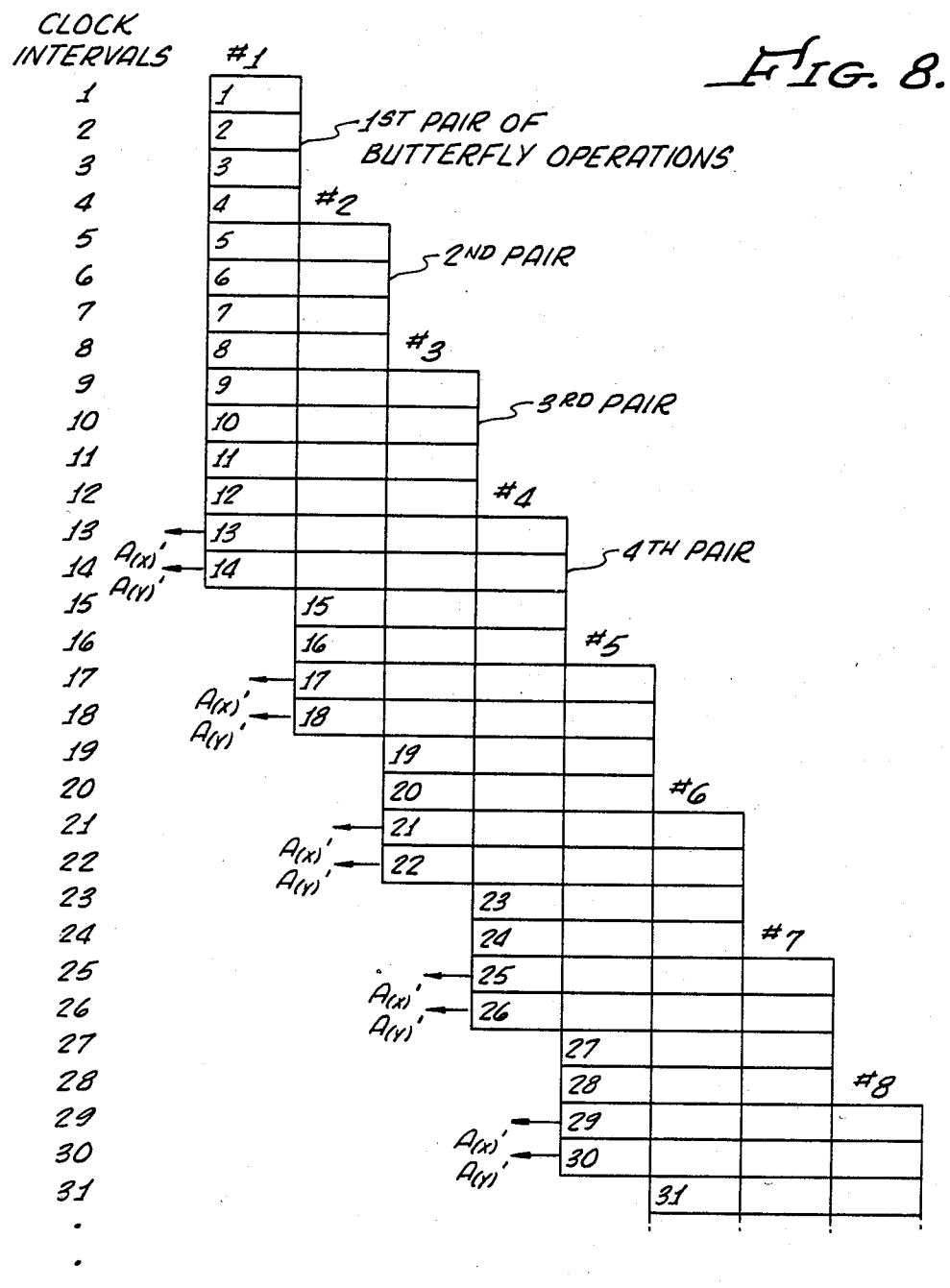
FIG. 8 shows the clock timing diagram of FIG. 7, illustrating the manner in which several of the 14 clock interval cycles are overlapped in the FFT such that the FFT is simultaneously operating on several pairs of butterfly computations so as to output pairs of computed A(x)'R/I and A(y)'R/I data every 4 clock intervals.

As can, however, be seen from the schematic timing diagram of FIG. 8, FFT 12 does not wait until the fifteenth, clock interval to start the next pair of butterfly computations. Instead, the next butterfly computational cycle or sequence starts at the fifth clock interval, while the first pair of butterfly computations is still being made. Likewise, the third butterfly computational sequence starts four clock intervals later (at the ninth clock interval) while both the first and second pair of butterfly computations are still being made. The fourth butterfly computational sequence starts another four clock intervals later (at the thirteenth clock interval), while the first three pairs of butterfly computations are still being made.

By the time the computation of the fifth pair of butterfly operations starts still another four clock intervals later (at the eighteenth clock interval), the first pair of butterfly computations has been completed, but the second, third and fourth butterfly computational sequences are still in progress. Thereafter, once the butterfly computational pipeline is filled (that is, upon initiation of the fourth butterfly computational sequence at the thirteenth clock interval), at least three, and sometimes four, butterfly computational sequences are always being worked on simultaneously, (until, towards the end of the last butterfly pass, when no more butterfly computational sequences are being initiated).

As a direct result of the above-described overlapping of 3-4 butterfly computational sequences, idle time of MAC 64 and adding/subtracting means 60 is kept to a minimum and an associated pair of A(x)' and A(y)' data is obtained every four clock intervals after the initial fourteen clock interval time. Such a four-clock interval data output period is depicted in the diagram of FIG. 8, which shows four clock intervals per column. Thus, when the first sequence proceeds to the second column (fifth interval) the second sequence starts at the beginning of the first column, and so on, as indicated in FIG. 8, until all the $\alpha$N/2 pairs of butterfly computations have been completed.

Figure 9:
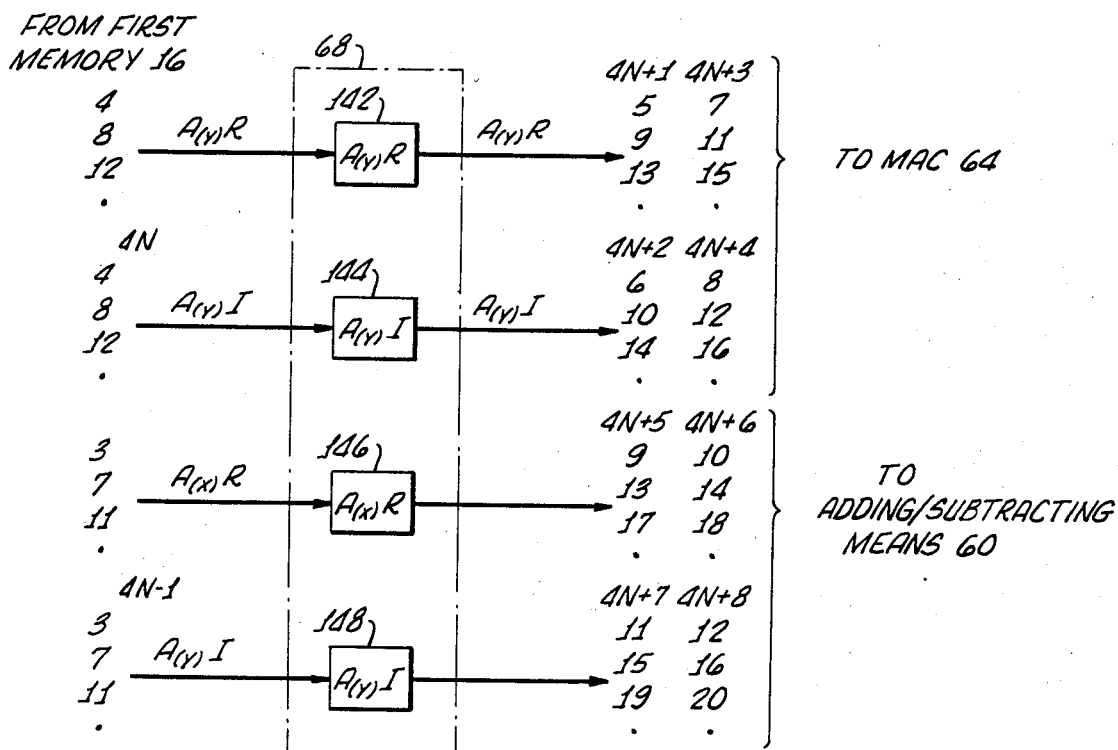
FIG. 9 is a diagram showing the clock timing schedules for the flow of A(x)R/I and A(y)R/I input data into and out of first data buffering means in the FFT.
Figure 10:
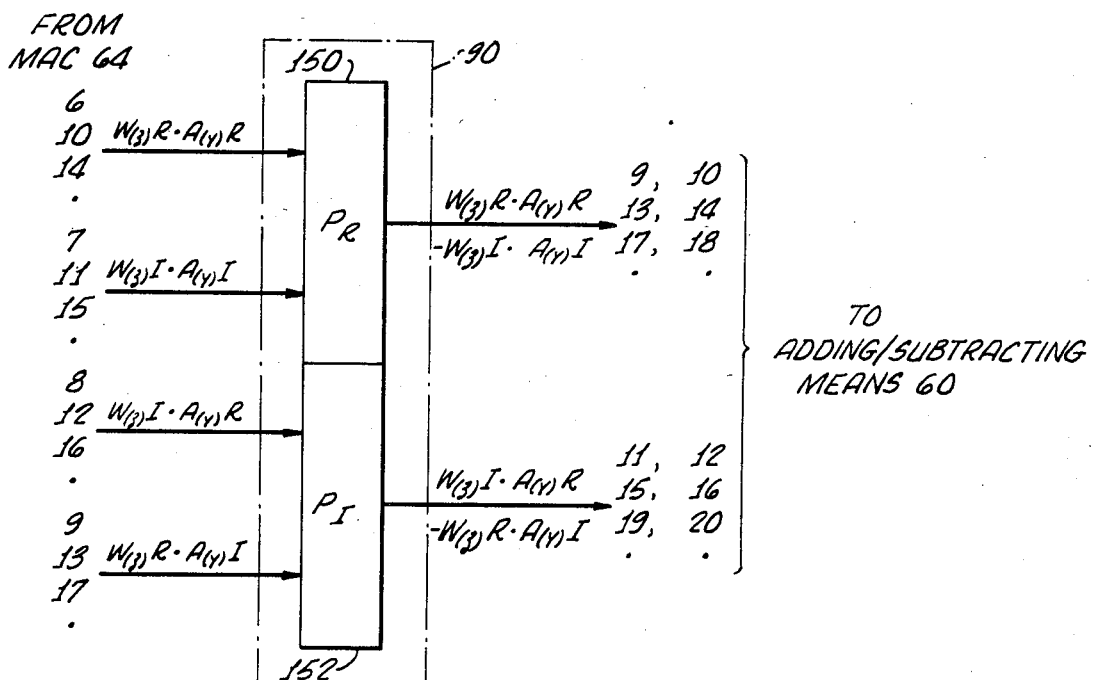
FIG. 10 is a diagram showing the clock timing schedules for the flow of computed W$_{(z)}$R/I·A(y)R/I data into and out of second data buffering means in the FFT.
Figure 11:
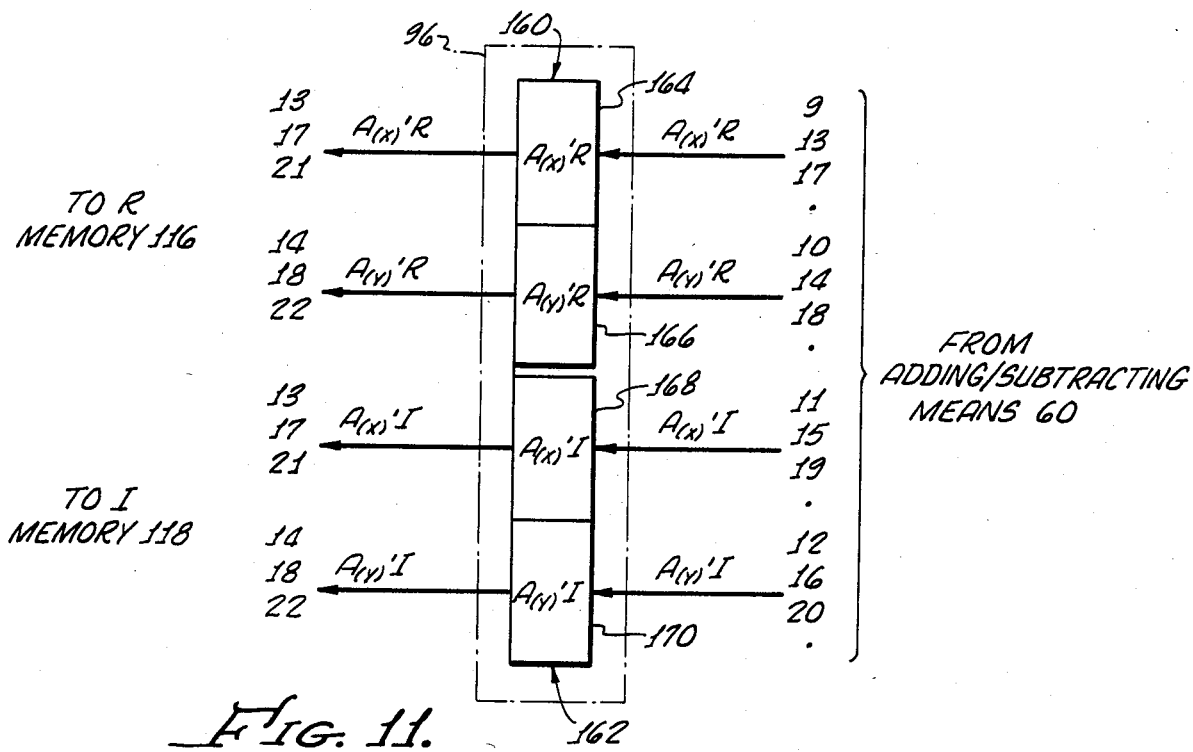
FIG. 11 is a diagram showing the clock timing schedules for the flow of computed A(x)'R/I and A(y)'R/I data into and out of third data buffering means in the FFT.

Although the clock timing schedules for writing A(x), A(y) and W$_{(z)}$ data into the appropriate ones of the buffering means 68, 90 and 46 and for reading (extracting) the data therefrom for computing the pairs of butterfly equations (13) and (14) is apparent from the foregoing discussion and from an examination of FIG. 7, these schedules are more particularly indicated in FIGS. 9, 10 and 11.

FIG. 9 emphasizes, for example, that a sequence A(y)R data is input from first memory 16 to first data buffering means 68 at clock intervals 4, 8, 12 . . . and is read at corresponding pairs of clock intervals 5, 7; 9, 11; 13, 15; . . . that is after the A(y)R data that is fed into the buffering means 68 during the 4th clock interval is read during the 5th and 7th intervals that particular A(y)R data is no longer required and the buffer storage space utilized thereby can be used for the storage of new A(y)R data. Similarly, a sequence of A(y)I data is written at clock intervals 4, 8, 12 . . . and is read at the corresponding pairs of intervals 6, 8; 10, 12; 14, 16; . . . A(x)R data is written in at clock intervals 3, 7, 11 . . . and read at the pairs of intervals 7, 10; 13, 14; 17, 18 . . . and A(x)I data is written at intervals 3, 7, 11 . . . and read at the pairs of intervals 11, 12; 15, 16; 19, 20 . . . .

Figure 12:
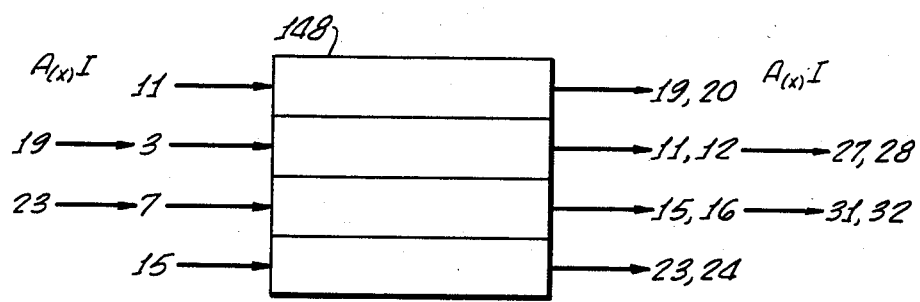
FIG. 12 is a schematic drawing showing write and read schedules of A(x)I data in a buffer disposed between an A(x)I memory and adding/subtracting means which use the A(x)I data for butterfly operations.

As can be seen, in the worst case situation, three sequences of A(x)I data are written (at clock intervals 3, 7 and 11) into buffer 148 before the first one of the A(x)I data is finally read at clock interval 12. The 4 by 4 type register used for buffer 148, however, permits simultaneous storage of four A(x)'s, as indicated in FIG. 12. Upon start up, A(x)I data is written into buffer 148 at clock intervals 3, 7, 11 and 15 and fills up the buffer. Since after clock interval 12 the first A(x)I data input at the 3rd interval is no longer needed, the 5th A(x) (at interval 19) is written to replace the first (interval 3) A(x)I data. Similarly, the 23rd interval A(x)I data replaces the 7th interval data, and so on. Microcoding means 62 is responsible for properly routing A(x)I data into buffer 148, as well as routing other data into the other buffers according to the schedules shown in FIGS. 9, 10 and 11.

In a similar manner, the clock schedules for inputting W$_{(z)}$R/I·A(y)R/I data to, and reading the data from, the second buffering means 90 is shown in FIG. 10. For example, a sequence of W$_{(z)}$R·A(y)R data is written into PR buffer 150 at clock intervals 6, 10, 14 . . . and a corresponding sequence W$_{(z)}$I·A(y)I data is written into the same buffer at intervals 7, 11, 15 . . . . The sum of the two data is read at corresponding pairs of intervals 9, 10; 13, 14; 17, 18 . . . .

FIG. 11 depicts the clock schedules for writing A(x)'-R/I and A(y)'R/I data into, and reading it from third buffering means. For example, A(x)'R data is written into buffer portions 164 at intervals 9, 13, 17 ... and A(y)'I data is written into buffer portion 168 at intervals 11, 15, 19 ... Both A(x)'R and A(y)'I are read at intervals 13, 17, 21 ....

It can therefore clearly be seen that the buffering means 68, 90 and 96 effectively decouple the data input (write) and output (read) schedules in such a manner as to enable time-efficient operation of MAC 64 and adding/subtracting means 60. Such efficient computational operation, as has been above described, enables pairs of A(x)' and A(y)' data to be outputted at a fast four clock interval rate and, as well, enables any one pair of butterfly operations to be computed in only 14 clock intervals. This fast operation is enabled with a minimum number of parts and, hence, enables a comparatively small and inexpensive FFT 12, as compared to known FFT's of comparable performance.

VARIATION OF FIG. 4

FFT 12, as shown in FIGS. 3 and 6 has been above-described as a "wraparound" type in which a single computing means 40 computes, in an iterative or sequential manner, all $\alpha$ sets of N/2 pairs of butterfly equations (13) and (14). To do so, the computed A(x)', A(y)' data from each pair of butterfly operations is fed back to first memory means 16 wherein such data is stored until almost all of the first pass is completed and first buffering means 68 can start accepting A(x), A(y) data for the second pass. At such time, the A(x)', A(y)' data is transferred (in the order shown on FIG. 5) as A(x), A(y) data to first buffering means 68. The described procedure is repeated, until all $\alpha$ passes have been run through computing means 40 and the Fourier spectrum, $f_m$, is obtained. As mentioned above, for N equal to about 16,000, $\alpha$ equals 14 and 14 passes through computing means 40 is therefore required before a next input signal sample set, $S_n$, can be operated on. Counter 178 connected to address generator 44 is provided for counting the number of passes.

Because of its speed of operation, the wraparound-type FFT 12 is ordinarily satisfactory for most purposes and by using only a single computing means 40, the size, weight, complexity and cost of FFT 12 can be comparitively small. Ordinarily these advantages outweight any disadvantage which might be attributed to the slower-than-possible speed of the wraparound configuration.

Nevertheless, in some applications, speed of FFT operation may be more critical than the described wraparound FFT's advantage of small size, cost, complexity and weight. For such high speed applications, a cascade-type of FFT, in which a number of FFT computers are arranged in serial order, may be preferred.

FIG. 4 depicts, in block diagram form, such a cascade-type fast Fourier transform. As shown, a cascade FFT 12a comprises a plurality of single pass FFT's or FFT computational units 180 which, except as described below, are identical to the above-described FFT 12. As such, each FFT 180 comprises a first A(x), A(y) data memory 16, a second, $W_{(z)}$ data memory 18, computing means (butterfly computer) 40 and an address generator 44.

However, instead of the A(x)', A(y)' data being fed from computing means 40 back to first memory 16 for use in a second butterfly pass, as was described for FFT 12, the A(x)' A(y)' data output from computing means 40 of any one of the single pass FFT's 180 is fed to first memory means 16 of the next-in-sequence single pass FFT 180.

As a consequence, the first-in-sequence single pass FFT 180 receives the $S_n$ data from signal sampler and digitizer 10 and performs the first pass of N/2 pairs of butterfly operations (equations (13 and (14)) therein. The resulting N/2 pairs of A(x)', A(y)' data is fed, as the data is generated, to the next-in-sequence single pass FFT 180 which performs the next pass of N/2 pairs of butterfly operations on the A(x)', A(y)' data and then passes the new A(x)', A(y)' data on to its next-in-sequence single pass FFT 180. The A(x)', A(y)' data output from the last-in-sequence single pass, FFT 180 is the Fourier spectrum, $f_m$, of the signal sample, $S_n$.

Since the computed A(x)' and A(y)' data is fed forwardly from the first FFT 180 to the next-in-sequence FFT 180, as soon as the first N/2 set of pairs of butterfly computations has been completed, a first pass on the next set of $S_n$ data can be immediately started, and the delay associated with the above-described wraparound FFT 12 is thereby avoided.

Cascade FFT 12a, as shown, comprises a number $\alpha$ of single pass FFT 180's. It is, however, within the scope of the present invention to cascade several wraparound type FFT's 12 so as to increase the speed of computing the Fourier spectrum, $f_m$, over that obtainable with use of a single wraparound FFT 12 without requiring $\alpha$ units. For example, for $\alpha$ equal to 14, seven wraparound FFT 12's could be cascaded and operate so that each FFT makes two butterfly passes before passing the second set of computed A(x)', A(y)' data on to the first memory 16 of the next-in-sequence FFT 12. Other wraparound/cascade arrangements can also obviously be used to advantage according to particular system requirements.

VARIATION OF FIGS. 13-15

As above described, FFT 12 requires 14 clock pulses to obtain the A(x)', A(y)' computational results from any one pair of butterfly operations. After the initial computations are completed at the 14th clock interval, due to the overlapping computational cycles, additional pairs of A(x)', A(y)' data are available at a rate of every four clock intervals until the entire Fourier spectrum is obtained.

Figure 14:
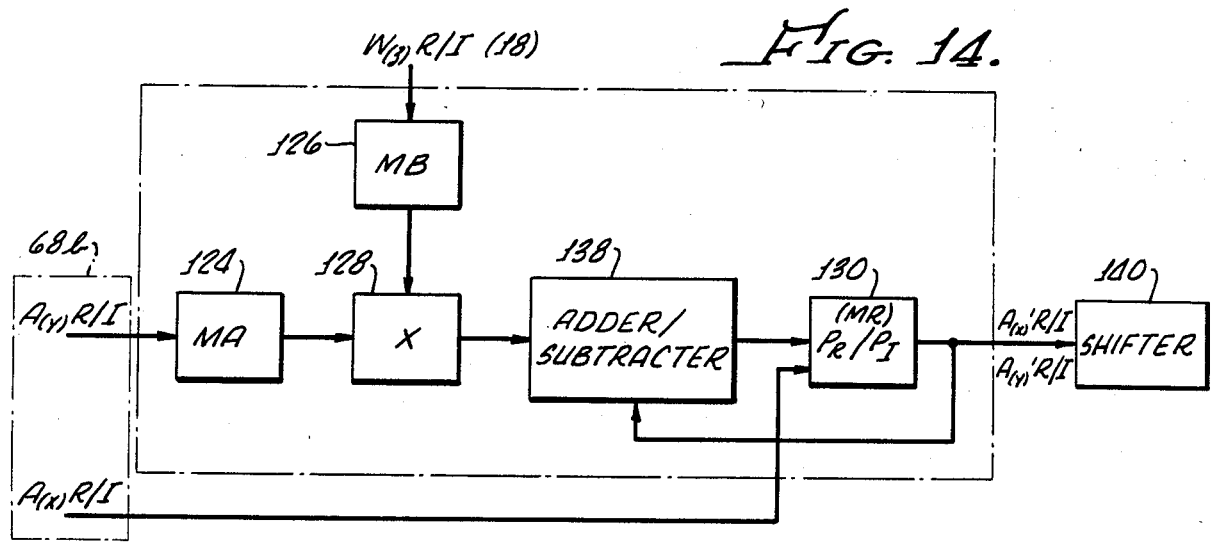
FIG. 14 is a diagram showing combined multiplier/accumulator and adder/subtractor portions of the variation FFT of FIG. 13.

In applications for which a butterfly computational rate slower than the above-described four clock interval rates for FFT's 12 or 12(a) is acceptable, some reduction in FFT circuit complexity can be achieved. Accordingly, a second variation wraparound-type FFT 12(b), diagrammed in FIGS. 13-15 provides an eight clock interval A(x)', A(y)' output rate, with any one pair of butterfly computations (Equations (13) and (14) taking 22 clock intervals.

Figure 13:
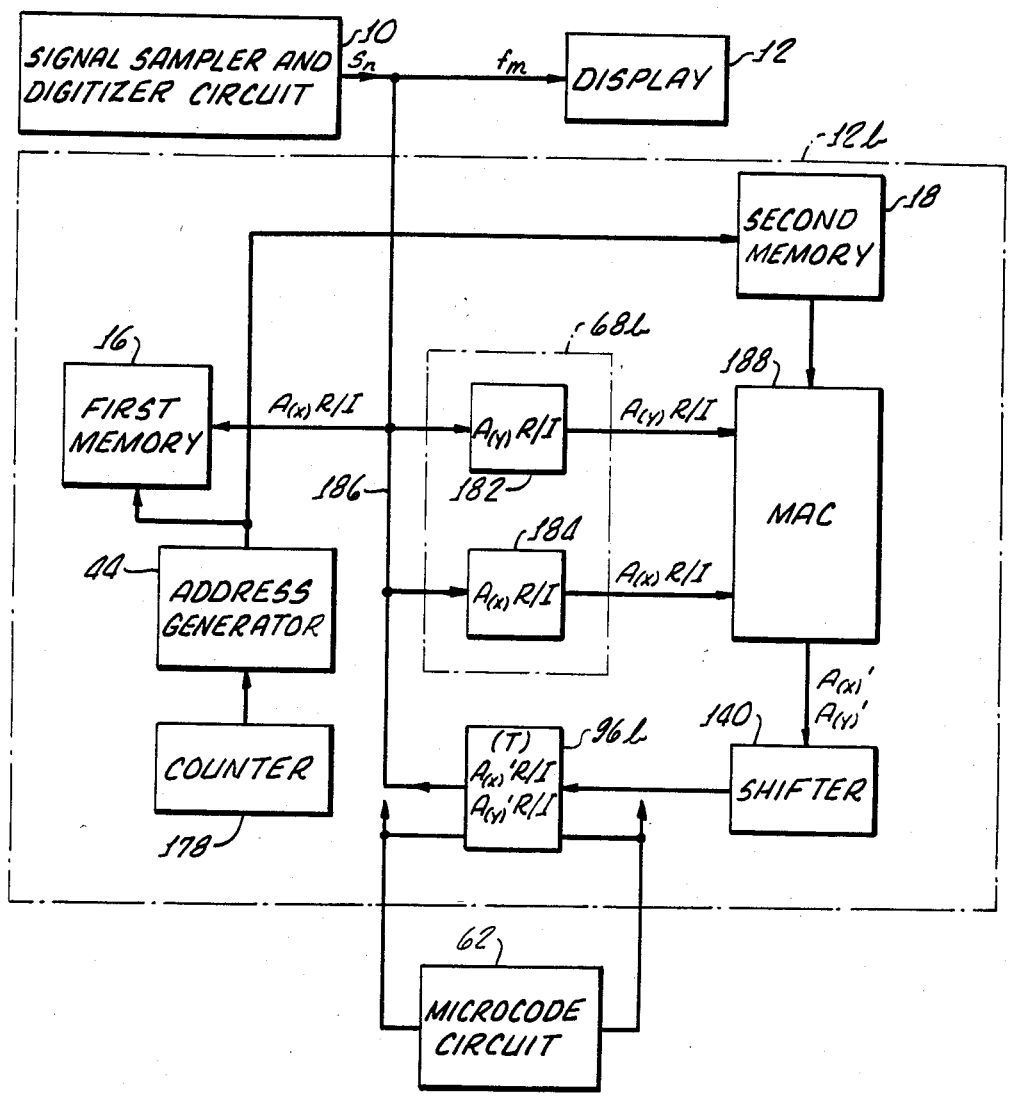
FIG. 13 is a diagram showing a variation, simplified FFT which computes a pair of butterfly operations in 22 clock intervals and which outputs computed pairs of A(x)'R/I and A(y)'R/I data at a rate of every eight clock intervals.

As shown in FIG. 13, FFT 12(b) includes the above-described first, A(x), A(y) memory 16; second, $W_{(z)}$ memory 18; address generator 44; counter 178 and microcoding means 62 (the clock is not shown). First buffering means 68(b), which corresponds to the described first buffering means 68, include an A(y) real and imaginary (A(y)R/I) buffer 182 and an A(x)R/I buffer 184. Buffers 182 and 184 are preferably the same as the previously described separate A(y)R, A(y)I, A(x)R and A(x)I buffers 142-148. First memory 16 feeds A(x)R/I data to A(y)R/I buffer 182 and A(x)R/I data to A(x)R/I buffer 184 via a common line 186. Computed A(x)'R/I and A(y)'R/I data is fed from buffering means 96(b) (corresponding to previously described third buffering means 96) back to first memory 16 via line 186. As shown, buffering means 96(b) comprises a single A(x)'R/I and A(y)'R/I buffer of the same type as previously described A(x)'R/A(y)'R and A(x)'I/A(y)'I buffers 160 and 162.

A(x)R/I and A(y)R/I data is fed from respective buffers 182 and 184 to a combination MAC and adder/subtracter circuit 188 $W_{(z)}$R/I data is also fed to circuit 188. Circuit 188 computes from the provided A(x), A(y) and $W_{(z)}$ data the A(x)' and A(y)' data in accordance with butterfly equations (13) and (14) in very much the same way as described for FFT 12. However, as seen in FIG. 14, circuit 188 combines the functions of the previously described MAC 64 and adder/subtracter 138, with the second buffering means (P(r)R/I) 90 being thereby eliminated. As such, circuit 188 includes MA 124, MB 126, X 128, adder/subtracter 138 and accumulator (MR) 130. Calculated $W_{(z)} \cdot$A(y) data is fed, as shown, from X 128 to adder/subtracter 138 A(x)R/I data is fed from A(x)R/I buffer 184 to MR 130. An output of MR 130 is fed back into adder/subtracter 138. A(x)', A(y)' data is outputted from the computed circuit 188 (from MR 130) to shifter 140 and therefrom to buffer 96(b).

Clock timing schedules of FFT 12(b) are shown in the timing diagram of FIG. 15, which corresponds to the FFT 12 timing diagram of FIG. 7. As shown in FIG. 15, the computed A(x)', A(y)' data is outputted at clock intervals 16, 18, 20 and 22. That is, any one pair of butterfly operations requires a total of 22 clock intervals of computing/outputting time, as compared to the 14 clock intervals required by FFT 12 (and 12(a)), Furthermore, as can also be seen, the timing diagram is established on an eight clock interval cycle, as indicated by the diagram comprising three columns of eight intervals each. This means that in the manner indicated in FIG. 8, for FFT 12, the butterfly computational cycles are overlapped so that more than one pair of butterfly computations are worked on by FFT 12(b) at the same time. These computational cycles start at eight clock pulse invervals: 1, 9, 17, 25 . . . until the Fourier spectrum, $f_m$, is obtained. Thus, when the first computational cycle reaches the stage represented by the top of the second column, (the 15th clock interval), the second computational cycle starts on the operation depicted in the first column, and so forth. As was above-described for FFT 12, the buffering means 68(b) decouples the A(x)R/I and A(y)R/I write and read schedules and buffering means 96(b) decouples the A(x)'R/I and A(x-)R/I and A(y)R/I write and read schedules and buffering means 96(b) decouple the A(x)'R/I and A(y)'R/I write and read schedules.

Inasmuch as the timing diagram depicted in FIG. 15 for FFT 12(b) is directly analogous to that of FIG. 7 for FFT 12, and since the diagram is explanatory in and of itself, no additional description of the diagram is considered necessary. An important point, however, is that the data input and A(x)', A(y)' outputs are staggered (on alternating clock cycles) so as to enable very efficient overlapping of computational cycles.

As can be seen from a comparison of FIGS. 6 and 13, FFT 12(b) is substantially less complex than FFT 12. For example, for FFT 12(b) second buffering means 90 is completely eliminated and the number of individual buffers in buffering means 68(b) and 96(b) is cut in half. Furthermore, FFT 12(b) is a single buss system (from memory 16) as opposed to the double buss system illustrated in FIG. 6 for FFT 12. Such FFT circuit simplification is, of course, at the sacrifice of halving the A(x)', A(y)' output speed, an 8, rather than 4, clock interval output rate being achieved.

It is to be appreciated that although FFT 12(b) has been shown and described as a wraparound-type FFT like FFT 12, the simplified circuitry of FFT 12(b) is adaptable to the cascade-type FFT's as described in conjunction with FIG. 3 for FFT 12(a).

A(x), A(y) and $W_{(z)}$ SELECTION (ADDRESS GENERATOR)

As was above described, a particular set of A(x), A(y) and $W_{(z)}$ data is required for each pair of butterfly computations represented by equations (13) and (14). The bit reversal procedure for reordering the $S_n$ input data was described, and the data selection order for the exemplary case of N equals 8 and $\alpha$ equals 3 was described and both were illustrated in FIG. 5.

The x, y and z's can be considered as locators or pointers into the A(x), A(y) and $W_{(z)}$ memory locations. For example, as described below, in the first butterfly pass, x=0, y=1, and z=2; in the second pass x=1, y=3, and z=2 and in the third pass x=2, y=6, and z=2. Inspection of FIG. 5 shows that the two "branches" of the butterfly computation patterns are separated by 1, 2 or 4 data points, depending on whether pass 1, 2, or 3 is involved. Thus, the difference between the x and y values is equal to $2^p$, wherein p is the number of the pass involved (p=0, 1, 2, for $\alpha$=3).

Observing the x and y addresses for the third pass (p=2), it is seen that x=0, 1, 2 and 3 and y=4, 5, 6, and 8, respectively, for butterfly pairs 1, 2, 3 and 4. The x values are simply the four states of a modular four (MOD 4) counter and the y values are equal to the x values plus 4.

In the second pass (p=1) the situation is analogous with one exception. For the first and second butterflies x=0, and 1, respectively; that is, the first 2 states of a MOD 2 counter. Because the butterfly separation is now $2^p$=2, the corresponding y values are 2 and 3. Because each data point is only operated on once per pass, the next two x values cannot be 2 and 3, so the x counter must jump to 4 and 5. Therefore, y=6 and 7.

In the first pass (p=0), the x values are given by the states of a modulo 1 counter which jumps by an increment of 2 for each successive butterfly pair.

Generalizing from the above, the x addresses for any given pass can be generated by a MOD $2^p$ counter plus an offset which changes in increments of $2^{p+1}$. For pass 2, p=1 and $2^{p+1}=2^2=4$, giving x=0+4 and 1+4=5. That is, a MOD' $2^p$ counter is equal to a MOD 2 counter which can jump by an offset equal to $2^{p+1}=4$ each time it "rolls over" (exhausts its $2^p$ status).

In respect to the z addresses, it can be seen that such addresses change by in increments of $2^{\alpha-(p+1)}=1$ so that $\alpha=\log_2 n$ ($\alpha=3$ for n=8). As an example, for the third butterfly pass, p=2 and $2^{\alpha-(p+1)}=1$ so that z=0, 1, 2 and 3 for butterflies 1, 2, 3 and 4.

For the second pass, z changes in multiples of $2^{\alpha-(p+1)}=2$. It must, however, be remembered that z is really z MOD N/2 (MOD 4 for N=8); therefore, since z is incremented in 2, z MOD 4=0, 2, 4, 6=0, 2, 0, 2. Likewise for the first pass z MOD 4=0, 4, 8, 12=0, 0, 0, 0.

From a consideration of the above generalizations, it can be seen that the x "counter" should jump every time the z value reaches 4. Therefore, on the second pass, x=0, 1 and z=0, 2 for the first two butterflies. However, since the next z value is z=4 (z MOD 4=0). Thus the x counter must jump to x=4. It can, therefore, be determined when the x counter must jump by simply adding an increment to $z=2^{\alpha-(p+1)}$ and testing to determine when x=N/2.

DETERMINATION OF Z $W_{(z)}$

The manner in which the z "pointer" for the $W_{(z)}$ real and imaginary terms is selected has been described above. A library of $W_{(z)}$ data, to ones of which the z's point is assumed available by being preprogrammed into second memory 18. The $W_{(z)}$'s are readily obtained from the well-known relationship, $W(z) = e^{-i2\pi/N}$ $$W_{(z)}R/I = \cos 2\pi/N\, z + i \sin 2\pi/N\, z \quad (39)$$

or, $$W_{(z)}R = \cos 2\pi/N\, z \quad (40)$$

$$W_{(z)}I = \sin 2\pi/N\, z \quad (41)$$

As an example, for N equal to eight, when z=2, $W_{(z)}R = \cos \pi/2 = 0$ and $W_{(z)}I = \sin \pi/2 = -1$. In such manner, the $W_{(z)}$ library can be constructed for N and z equal to any numbers.

Although there have been described above specific arrangements of a fast Fourier transform apparatus with timing schedule decoupling in accordance with the present invention for purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. Fast Fourier transform (FFT) apparatus for obtaining the Fourier spectrum, $f_m$, from a sequence of N time-variable function samples, $S_n$, in accordance with the general matrix equation:

$$f_m = \sum_{n=0}^{N-1} S_n [W_{mn}],$$

and the equivalent, expanded matrix equation $$f_m = \sum_{n=0}^{N-1} [M^{\alpha-1}] \cdot [M^{\alpha-2}] \ldots [M^0]\, S_n,$$

obtained by factoring the matrix $[W_{mn}]$ into a series of $\alpha$ sparse matrices $[M^{\alpha-1}][M^{\alpha-2}] \ldots [M^0]$, the number $\alpha$ being determined in accordance with $N=2^\alpha$, each of the sparse matrices $[M^{\alpha-1}], [M^{\alpha-2}], \ldots [M^0]$ being equivalent to the operation of N/2 pairs of butterfly operations of the general form:

$$A(x)' = A(x) + W_{(z)} \cdot A(y), \text{ and}$$

$$A(y)' = A(x) - W_{(z)} \cdot A(y),$$

wherein A(x) and A(y) are data terms which include the signal data $S_n$, and $W_{(z)}$ is the appropriate matrix term of the associated sparse matrix, the sequence of A(x), A(y) and $W_{(z)}$ terms for each of the $\alpha$ sets of N/2 pairs of operation being predetermined and based on the numbers $\alpha$ and N, said fast Fourier transform apparatus comprising:

(a) FFT data processing means for computing a first set of said N/2 pairs of butterfly operations, said processing means being connected for receiving said $S_n$ data and including:
   (1) first memory means for storing said A(x) and A(y) data, including said $S_n$ data;
   (2) second memory means for storing said predetermined $W_{(z)}$ data;
   (3) timing means for providing a timing schedule clock of frequency, f;
   (4) address generating means for locating A(x), A(y) and $W_{(z)}$ data in said memories;
   (5) butterfly computing means responsive to said timing means for receiving said A(x), A(y) and $W_{(z)}$ data in accordance with a first, data input timing schedule and for using the data to sequentially perform said N/2 pairs of said butterfly operations in accordance with a second, data retrieving timing schedule, said butterfly computing means including:
      (i) multiplying/accumulating means for receiving A(y) and $W_{(z)}$ data, for performing complex $W_{(z)} \cdot A(y)$ multiplication and for accumulating the results thereof;
      (ii) adding/subtracting means for receiving A(x) and $W_{(z)} \cdot A(y)$ data and for performing complex $A(x) + W_{(z)} \cdot A(y)$ addition and complex $A(x) - W_{(z)} \cdot A(y)$ subtraction thereof;
      (iii) microcoding means for establishing and enabling said first and second timing schedules, and
      (iv) data decoupling means connected between said first memory means and said multiplying-/accumulating means and between said first memory means and said adding/subtracting means for buffering the flow of A(x) and A(y) data therebetween so as to operationally decouple said first timing schedule from said second timing schedule, thereby enabling the butterfly computing means to be computing at least two different pairs of said butterfly operations at the same time; and (b) means enabling iterative computing of $\alpha - 1$ subsequent sets of N/2 pairs of butterfly computations, by using the N/2 pairs of A(x)' and A(y)' output complex numbers from any butterfly computations as the input set of A(x) and A(y) complex numbers for the next-in-sequence set of N/2 pairs of butterfly computations, and for outputting the last-in-sequence set of N/2 pairs of A(x)' and A(y)' complex numbers as the Fourier spectrum, $f_m$.

2. The fast Fourier transform apparatus according to claim 1 wherein said butterfly computing means is operative for outputting an initial associated pair of A(x)'A(y)' data in between about 14 and about 22 clock intervals and for thereafter outputting subsequent pairs of A(x)' and A(y)' results at intervals of between about four (4) and about eight (8) clock time intervals.

3. The fast Fourier transform apparatus according to claim 2, wherein the initial A(x)', A(y)' output is in about 22 clock intervals and the subsequent rate of A(x)', A(y)' data output is about 8 clock intervals.

4. The fast Fourier transform apparatus according to claim 1 wherein said butterfly computing means is operative for computing and outputting the first of an associated pair of A(x)', A(y)' complex butterfly computational results in about fourteen (14) clock intervals and for thereafter outputting subsequent, associated pairs of A(x)', A(y)' complex butterfly computational results about every four (4) clock intervals until all $\alpha$ sets of N/2 pairs of butterfly computations are completed.

5. The fast Fourier transform apparatus according to claim 1 wherein said decoupling means are also connected between said multiplying/accumulating means and said adding/subtracting means for buffering the flow of W(z)·A(y) data therebetween so as to enable the decoupling of multiplying/accumulating and adding-/subtracting timing schedule portions of the second timing schedule from one another.

6. The fast Fourier transform apparatus according to claim 1 wherein said means for enabling iterative computing of $\alpha-1$ subsequent sets of N/2 pairs of butterfly computations include means for feeding the A(x)' and A(y)' output of the adding/subtracting means back-to said first memory means, thereby forming a "wraparound"-type FFT, and means for counting the number of wraparound butterfly computational passes so as to enable the A(x)' and A(y)' complex numbers of the last-in-sequence pass to be outputted as the desired Fourier spectrum, $f_m$.

7. The fast Fourier transform apparatus according to claim 1 wherein said means for enabling iterative computing of $\alpha-1$ subsequent sets of N/2 butterfly computations include a plurality of said FFT data processing means connected in serial order with the output of the adding/subtracting means of one FFT data processing means being connected to the first memory means of the next-in-sequence FFT data processing means, the A(x)' and A(y)' data of said one FFT data processing means being used as the A(x) and A(y) data for the butterfly computations of said next-in-sequence FFT data processing means.

8. The fast Fourier transform apparatus according to claim 7 wherein the number of FFT data processing means connected in serial order is equal to $\alpha$, the A(x)' and A(y)' complex number data from butterfly computation made by the last FFT data processing means being the desired Fourier spectrum, $f_m$.

9. Fast Fourier transform (FFT) apparatus for obtaining the Fourier spectrum, $f_m$, from a sequence of N time-variable function samples, $S_n$, in accordance with the general matrix equation:

$$f_m = \sum_{n=0}^{N-1} S_n [W_{mn}],$$

and the equivalent, expanded matrix equation $$f_m = \sum_{n=0}^{N-1} [M^{\alpha-1}] \cdot [M^{\alpha-2}] \ldots [M^0] S_n$$

obtained by factoring the matrix $[W_{mn}]$ into a series of $\alpha$ sparse matrices $[M^{\alpha-2}] [M^{\alpha-2}] \ldots [M^0]$, the number $\alpha$ being determined in accordance with $N=2^\alpha$, each of the sparse matrices $[M^{\alpha-1}], [M^{\alpha-2}], \ldots, [M^0]$ being equivalent to the operation of N/2 pairs of butterfly operations of the general form:

$$A(x)' = A(x) + W_{(z)} \cdot A(y), \text{ and}$$

$$A(y)' = A(x) - W_{(z)} \cdot A(y),$$

wherein A(x) and A(y) are data terms which include the signal data $S_n$, and $W_{(z)}$ is the appropriate matrix term of the associated sparse matrix, the sequence of A(x), A(y) and $W_{(z)}$ terms for each of the $\alpha$ sets of N/2 pairs of operation being predetermined and based on the numbers $\alpha$ and N, said fast Fourier transform apparatus comprising:

(a) FFT data processing means for computing a first set of said N/2 pairs of butterfly operations, said processing means being connected for receiving said $S_n$ data and including:
  (1) first memory means for storing A(x) and A(y) data, including said $S_n$ data;
  (2) second memory means for storing predetermined $W_{(z)}$ data;
  (3) timing means for providing a timing schedule clock of frequency, f;
  (4) address generating means for locating A(x), A(y) and $W_{(z)}$ data in said memories;
  (5) butterfly computing means responsive to said timing means for receiving said A(x), A(y) and $W_{(z)}$ data in accordance with a first, data input timing schedule and for sequentially using said data to perform said N/2 pairs of butterfly operations in accordance with a second, data retrieval timing schedule, said butterfly computing means including:
    (i) multiplying/accumulating means for receiving A(y) and W(z) data, for performing complex $W_{(z)} \cdot A(y)$ multiplication and for accumulating the results thereof;
    (ii) adding/subtracting means for receiving A(x) and $W_{(z)} \cdot A(y)$ data and for performing complex $A(x) + W_{(z)} \cdot A(y)$ addition and $A(x) - W_{(z)} \cdot A(y)$ subtraction thereof;
    (iii) microcoding means for establishing and enabling said first and second timing schedules; and
    (iv) data decoupling means connected between said first memory means and said multiplying-/accumulating means and between said first memory means and said adding/subtracting means for buffering the flow of A(x) and A(y) data therebetween so as to enable decoupling of said second timing schedule from said first timing schedule, thereby enabling the butterfly computing means to be computing at least two different pairs of said butterfly operations at the same time; and
(b) means interconnecting an output of the adding-/subtracting means with an input to the first memory means to enable feeding of the adding/subtracting means output A(x)' and A(y)' data to said first memory means for use as A(x) and A(y) data for computation of a next set of N/2 pairs of the butterfly operations; and
(c) means for counting the number of sets of N/2 pairs of butterfly operations from recirculating the A(x)' and A(y)' data from the adding/subtracting means back to the first memory means and for causing the A(x)' and A(y)' data to be outputted from the data processing means after $\alpha$ sets of N/2 pairs of butterfly operations have been completed.

10. Fast Fourier transform (FFT) apparatus for obtaining the Fourier spectrum, $f_m$, from a series of N time-variable functional samples, $S_n$, in accordance with the matrix equation:

$$f_m = \sum_{n=0}^{N-1} S_n [W_{mn}],$$

and the equivalent, expanded matrix equation $$f_m = \sum_{n=0}^{N-1} [M^{a-1}] \cdot [M^{a-2}] \ldots [M^0] S_n$$

obtained by factoring the matrix [$W_{mn}$] into a series of $\alpha$ sparce matrixes [$M^{a-1}$] [$M^{a-2}$] ... [$M^0$], the number $\alpha$ being determined in accordance with $N=2^\alpha$, each of the sparse matrices [$M^{a-1}$], [$M^{a-2}$], ..., [M] being equivalent to the operation of N/2 pairs of butterfly operations of the general form:

$$A(x)' = A(x) + W_{(z)} \cdot A(y), \text{ and}$$

$$A(y)' = A(x) - W_{(z)} \cdot A(y),$$

wherein A(x) and A(y) are data terms which include the signal data $S_n$ and $W_{(z)}$ is the appropriate matrix term of the associated sparse matrix, the sequence of A(x), A(y) and $W_{(z)}$ terms for each of the $\alpha$ sets of N/2 pairs of operation being predetermined and based on the numbers $\alpha$ and N, said fast Fourier transform apparatus comprising:

(a) a plurality of FFT data processing means each configured for performing a set of N/2 pairs of butterfly operations, a first of said FFT data processing means being configured for receiving said N samples of $S_n$ and a last of said FFT data processing means being configured for outputting the desired Fourier spectrum, $f_m$, said plurality being equal to $\alpha$, each of said FFT data processing means including:

(1) first memory means for storing A(x) and A(y) data;

(2) second memory means for storing predetermined $W_{(z)}$ data;

(3) timing means for providing a timing schedule clock of frequency, f;

(4) address generating means for locating A(x), A(y) and $W_{(z)}$ data in said memories;

(5) butterfly computing means responsive to said timing means for receiving said A(x), A(y) and $W_{(z)}$ data in accordance with a first, data input timing schedule and for sequentially using said data to perform said N/2 pairs of said butterfly operations in accordance with a second, data retrieval timing schedule, said butterfly computing means including:

(i) multiplying/accumulating means for receiving A(y) and $W_{(z)}$ data, for performing complex $W_{(z)} \cdot A(y)$ multiplication and for accumulating the results thereof;

(ii) adding/subtracting means for receiving A(x) and $W_{(z)} \cdot A(y)$ data and for performing complex $A(x) + W_{(z)} \cdot A(y)$ addition and complex $A(x) - W_{(z)} \cdot A(y)$ subtraction thereof;

(iii) microcoding means for establishing and enabling said first and second timing schedule; and (iv) data decoupling means connected between said first memory means and said multiplying and accumulating means and said adding/subtracting means for buffering the flow of A(x) and A(y) data therebetween so as to decouple said second timing schedule from said first timing schedule, thereby enabling the butterfly computing means to work on at least two different pairs of said butterfly equations at the same time; and (b) means for interconnecting said plurality of FFT data processing means in serial order so that computed A(x)' and A(y)' complex number data of any one, except for said last-in-sequence processing means, of said FFT data processing means is fed into the first memory means of the next-in-sequence one of the FFT data processing means so as to provide the A(x) and A(y) data for the next iterative set of N/2 pairs of butterfly operations.

11. The fast Fourier transform (FFT) according to claims 9 or 10 wherein said data processing means are configured and operative for computing and outputting of an initial pair of A(x)', A(y)' data is about 22 clock intervals and for thereafter outputting sequential pairs of A(x)', A(y)' data at a rate of about every 8 clock intervals.

12. The fast Fourier transform (FFT) according to claims 9 or 10 wherein said data processing means are configured and operative for computing and outputting an initial pair of A(x)', A(y)' data in about 22 clock intervals and for thereafter outputting subsequent pairs of A(x)', A(y)' data at a rate of about every 4 clock intervals.

13. The fast Fourier transform (FFT) according to claims 1, 9 or 10 wherein said data decoupling means include a plurality of 4 parallel bit input/output RAMs.

* * * * *